(12) United States Patent
Hebrink et al.

(10) Patent No.: US 6,569,515 B2
(45) Date of Patent: May 27, 2003

(54) MULTILAYERED POLYMER FILMS WITH RECYCLABLE OR RECYCLED LAYERS

(75) Inventors: Timothy J. Hebrink, Oakdale, MN (US); Yaoqui Joe Liu, St. Paul, MN (US); William W. Merrill, White Bear Lake, MN (US); Bruce A. Nerad, Oakdale, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/006,456

(22) Filed: Jan. 13, 1998

(65) Prior Publication Data

US 2002/0025444 A1 Feb. 28, 2002

(51) Int. Cl.⁷ .................. B32B 7/02; B32B 27/06; G02B 5/30; G02B 1/10
(52) U.S. Cl. .............. 428/212; 428/412; 428/480; 428/520; 428/903.3; 359/494; 359/580
(58) Field of Search .................. 359/494, 584, 359/580; 428/480, 212, 903.3, 412, 520; 264/37.32, 37.33, 1.1, 1.7, 911, 920, 921; 427/359, 102, 163.1

(56) References Cited

U.S. PATENT DOCUMENTS

| | | | |
|---|---|---|---|
| 2,803,552 A | 8/1957 | Stedman | |
| 3,022,178 A | 8/1962 | Park et al. | 106/13 |
| 3,075,228 A | 1/1963 | Elias | 15/506 |
| 3,124,639 A | 3/1964 | Kahn | 88/65 |
| 3,212,909 A | 10/1965 | Leigh | 106/13 |
| 3,610,729 A | 10/1971 | Rogers | 350/157 |
| 3,711,176 A | 1/1973 | Alfrey, Jr. et al. | 350/1 |
| 3,819,522 A | 6/1974 | Zmoda | 252/89 |
| 3,860,036 A | 1/1975 | Newman, Jr. | 138/45 |
| 3,884,850 A * | 5/1975 | Ostrowski | 260/2.3 |
| 3,897,356 A | 7/1975 | Pociluyko | 252/91 |

(List continued on next page.)

FOREIGN PATENT DOCUMENTS

| | | | |
|---|---|---|---|
| DE | 99/58328 | 11/1999 | |
| EP | 591055 | 9/1993 | ............ B32B/7/02 |
| GB | 1398853 | * 11/1971 | |
| JP | 6[1994]41335 | 2/1994 | |
| JP | 2000-141573 | 11/1998 | |

(List continued on next page.)

OTHER PUBLICATIONS

American Association for the Advancement of Science, Giant Birefringent Optics in Multilayer Polymer Mirrors, Science vol. 287, No. 5462, pp. 2451–2456.

(List continued on next page.)

Primary Examiner—Paul Thibodeau
Assistant Examiner—Kevin R Kruer
(74) Attorney, Agent, or Firm—Bruce E. Black

(57) ABSTRACT

A multilayered polymer film is formed with a stack of one or more first optical layers, one or more second optical layers, and one or more non-optical layers. These optical and non-optical layers are typically made using polymer materials, such as polyesters. In one embodiment, the non-optical layers are made from a polyester having a composition which corresponds to the average molar composition of the combination of all of the first and second optical layers. Using this formulation, scrap material from the manufacture of multilayered polymer films may be used to generate the non-optical layers in subsequent films. Alternatively, the non-optical layers of a multilayered polymer film are made using scrap material from prior-manufactured multilayered polymer films with the optional addition of other polymer material which may be either new or recycled.

33 Claims, 1 Drawing Sheet

U.S. PATENT DOCUMENTS

| | | | |
|---|---|---|---|
| 4,446,305 A | 5/1984 | Rogers et al. | 528/348 |
| 4,478,909 A | 10/1984 | Taniguchi et al. | 428/331 |
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,720,426 A | 1/1988 | Englert et al. | 428/344 |
| 5,188,760 A | 2/1993 | Hikmet et al. | 252/299.01 |
| 5,211,878 A | 5/1993 | Reiffenrath et al. | 252/299.63 |
| 5,235,443 A | 8/1993 | Barnik et al. | 359/37 |
| 5,269,995 A | 12/1993 | Ramanathan et al. | 264/171 |
| 5,294,657 A | 3/1994 | Melendy et al. | 524/270 |
| 5,316,703 A | 5/1994 | Schrenk | 264/1.3 |
| 5,319,478 A | 6/1994 | Fijnfschilling et al. | 359/53 |
| 5,389,324 A | 2/1995 | Lewis et al. | 264/171 |
| 5,448,404 A | 9/1995 | Schrenk et al. | 359/584 |
| 5,486,935 A | 1/1996 | Kalmanash | 359/37 |
| 5,486,949 A * | 1/1996 | Shrenk et al. | 359/498 |
| 5,559,159 A * | 9/1996 | Sublett et al. | 521/48.5 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,699,188 A | 12/1997 | Gilbert et al. | 359/584 |
| 5,721,603 A | 2/1998 | De Vaan et al. | 349/194 |
| 5,744,534 A | 4/1998 | Ishiharada et al. | 524/442 |
| 5,751,388 A | 5/1998 | Larson | 349/96 |
| 5,767,935 A | 6/1998 | Ueda et al. | 349/112 |
| 5,770,306 A | 6/1998 | Suzuki et al. | 428/328 |
| 5,783,120 A | 7/1998 | Ouderkirk et al. | 264/134 |
| 5,793,456 A | 8/1998 | Broer et al. | 349/98 |
| 5,808,794 A | 9/1998 | Weber et al. | 359/487 |
| 5,825,542 A | 10/1998 | Cobb, Jr. et al. | 359/487 |
| 5,825,543 A | 10/1998 | Ouderkirk et al. | 359/494 |
| 5,905,554 A * | 5/1999 | Kyu | 349/122 |
| 5,972,445 A | 10/1999 | Kimura et al. | 428/35.4 |

FOREIGN PATENT DOCUMENTS

| | | | |
|---|---|---|---|
| JP | 11-010723 A | 1/1999 | |
| JP | 2859973 | 2/1999 | |
| WO | WO 95/27919 | 4/1995 | G02B/27/28 |
| WO | WO 95/17303 | 6/1995 | B32B/7/02 |
| WO | WO 95/17691 | 6/1995 | G02B/5/30 |
| WO | WO 95/17692 | 6/1995 | G02B/5/30 |
| WO | WO 95/17699 | 6/1995 | G02F/1/1335 |
| WO | WO 96/18691 | 6/1996 | |
| WO | WO 96/19347 | 6/1996 | B32B/7/02 |
| WO | WO 97/01440 | 1/1997 | B32B/27/36 |
| WO | WO 97/01774 | 1/1997 | G02B/1/10 |
| WO | WO 97/32226 | 9/1997 | G02B/5/30 |

OTHER PUBLICATIONS

George Mackey, A review of Advanced Recycling Technology, ACS Symp. SER. (1995), 609 (Plastics, Rubber, and Paper Recycling), 161–69.

Schrenk et al., Nanolayer polymeric optical films, Tappi Journal, pp. 169–174, Jun. 1992.

* cited by examiner

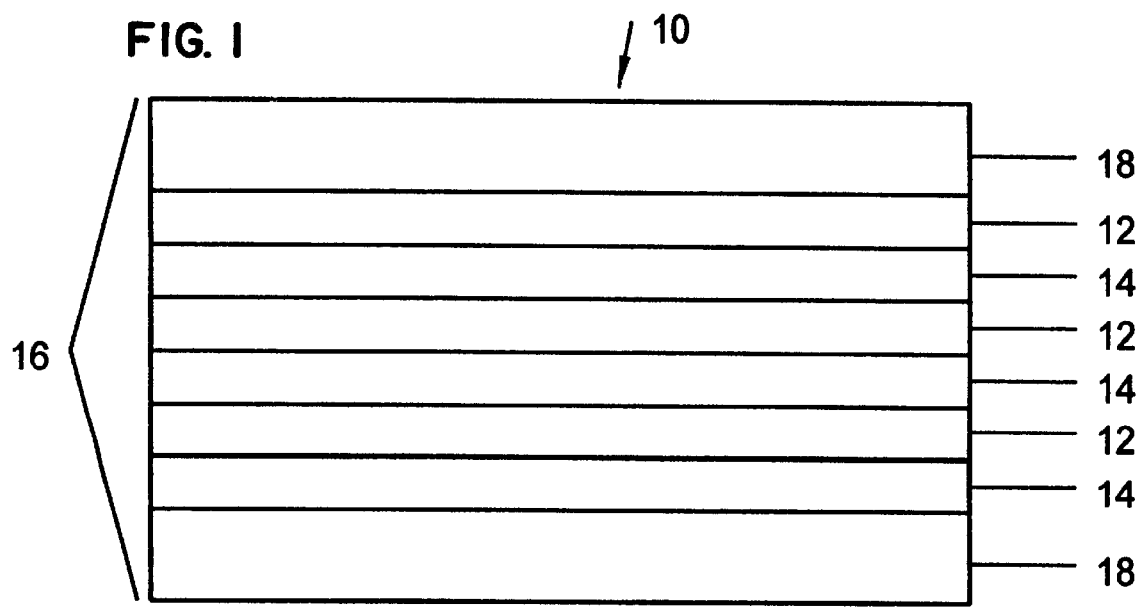
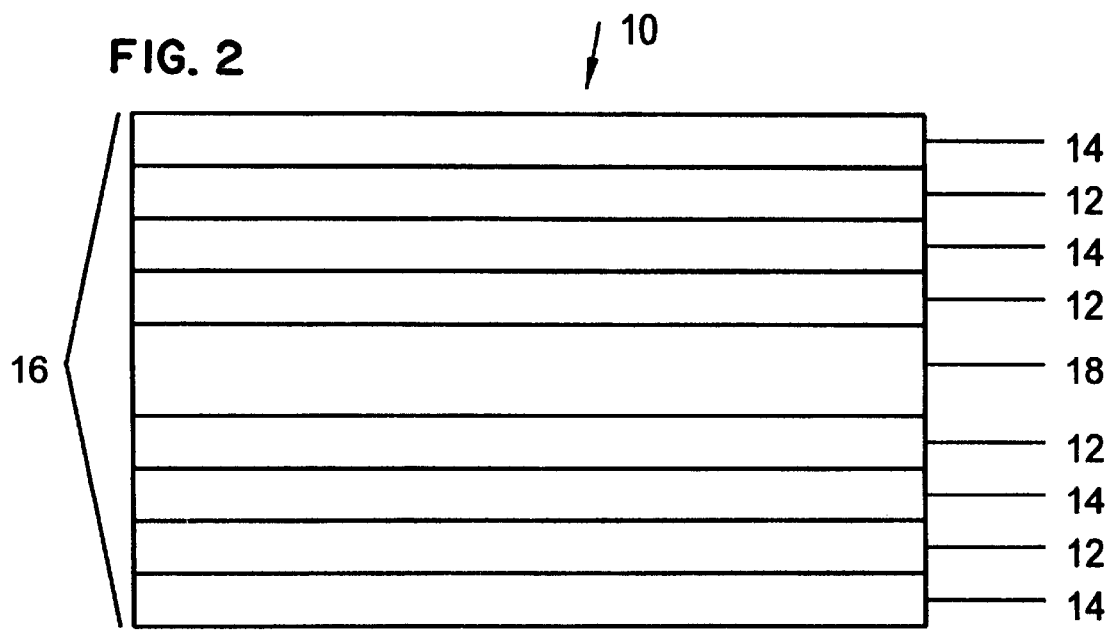

MULTILAYERED POLYMER FILMS WITH RECYCLABLE OR RECYCLED LAYERS

FIELD OF THE INVENTION

The present invention relates to multilayered optical films having a composition that allows for recycling of scrap material from the films into one or more layers of subsequent films and to multilayered optical films having one or more layers made using material recycled from previously manufactured films.

BACKGROUND OF THE INVENTION

Polymeric films are used in a wide variety of applications. One particular use of polymeric films is in mirrors and polarizers which reflect light of a given polarization and wavelength range. Such reflective films are used, for example, in conjunction with backlights in liquid crystal displays to enhance brightness and reduce glare of the display. A polarizing film may be placed between the user and the backlight to direct the light towards the user and to polarize the light; thereby reducing the glare. In addition, a mirror film may be placed behind the backlight to reflect light towards the user; thereby enhancing brightness. Another use of polarizing films is in articles, such as sunglasses, to reduce light intensity and glare.

One type of polymer that is useful in creating polarizer or mirror films is a polyester. One example of a polyester-based polarizer includes a stack of polyester layers of differing composition. One configuration of this stack of layers includes a first set of birefringent layers and a second set of layers with an isotropic index of refraction. The second set of layers alternates with the birefringent layers to form a series of interfaces for reflecting light. The polarizer may also include one or more non-optical layers which, for example, cover at least one surface of the stack of layers to prevent damage to the stack during or after processing. There are other configurations that may also be used in polarizer/mirror films including stacks of layers with two or more different sets of birefringent and/or isotropic layers.

The properties of a given polyester are typically determined by the monomer materials utilized in the preparation of the polyester. A polyester is often prepared by reactions of one or more different carboxylate monomers (e.g., compounds with two or more carboxylic acid or ester functional groups) with one or more different glycol monomers (e.g., compounds with two or more hydroxy functional groups). Each set of polyester layers in the stack typically has a different combination of monomers to generate the desired properties for each type of layer.

With the manufacture of polarizers and mirrors, an amount of scrap material is generated due to activities such as sizing and trimming the film. This scrap material typically contains a mixture of the various layers that are used in the polymer film. It is desirable to find a use for this scrap material to reduce waste.

SUMMARY OF THE INVENTION

Generally, the present invention relates to a multilayered polymer film. One embodiment is a multilayered optical film having a stack of layers which includes one or more first optical layers made from a first polymeric material; one or more second optical layers made from a second polymeric material; and one or more non-optical layers made from recycled polymeric material. The one or more non-optical layers are provided within the stack of layers in such a way that at least a portion of the light passing through the one or more first and second optical layers also passes through at least one of the non-optical layers.

Another embodiment is a multilayered polymer film with a stack of layers that includes one or more first optical layers, one or more second optical layers, and one or more non-optical layers. The one or more first optical layer are made from a first polyester which includes first carboxylate subunits. The one or more second optical layers are made from a second polyester which includes second carboxylate subunits that are different than the first carboxylate subunits. The one or more non-optical layers are made from a third polyester which includes the first and second carboxylate subunits in the same relative molar proportions as the molar proportions of the first and second carboxylate subunits in a combination of all the first and second optical layers of the multilayered polymer film.

Another embodiment is a multilayered polymer film with a stack of layers that includes one or more first optical layers, one or more second optical layers, and one or more non-optical layers. The one or more first optical layers are made from a first polyester which includes first glycol subunits. The one or more second optical layers are made from a second polyester which includes second glycol subunits that are different than the first glycol subunits. The one or more non-optical layers are made from a third polyester which includes the first and second glycol subunits in the same relative molar proportions as the molar proportions of the first and second glycol subunits in a combination of all the first and second optical layers of the multilayered polymer film. In some instances, the second polyester includes third carboxylate subunits, which can be the same as the first carboxylate subunits of the first polyester. Also, in some instances, the first polyester includes fourth carboxylate subunits.

Another embodiment is a multilayered optical film having a stack of layers with one or more first optical layers, one or more second optical layers, and one or more non-optical layers. The one or more first optical layers are made with a first polyester. The one or more second layers are made with a second polyester. The one or more non-optical layers are made with a polyester material that is recycled from one or more prior-manufactured multilayered polymer films A further embodiment is a non-optical layer for use in a stack of layers forming a multilayered optical film. The non-optical layer is made from polyester material which is recycled from one or more prior-manufactured multilayered polymer films.

Yet another embodiment is a method for making a multilayered optical film which includes obtaining scrap material generated by the prior manufacture of one or more multilayered polymer films and forming a multilayered polymer film which contains a stack of layers. The stack of layers includes one or more first optical layers, one or more second optical layers, and one or more non-optical layers. The one or more non-optical layers being formed with the scrap material.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 1 is a cross-sectional view of one embodiment of a multilayered film, according to the present invention; and FIG. 2 is a cross-sectional view of another embodiment of a multilayered film, according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention relates to multilayered polymer films for optical applications and the use of scrap material remaining after the manufacture of one or more multilayered polymer films in the subsequent manufacture of other films. For example, recycled scrap material may be used by itself or in combination with raw materials to form one or more non-optical layers which may protect the optical layers in a multilayered polymer film and/or provide additional mechanical support for the film.

FIG. 1 shows a multilayered polymer film 10 which may be used, for example, as an optical polarizer or mirror. The film 10 includes one or more first optical layers 12, one or more second optical layers 14, and one or more non-optical layers 18. The first optical layers 12 are preferably birefringent polymer layers which are uniaxially- or biaxially-oriented. The second optical layers 14 may also be polymer layers which are birefringent and uniaxially- or biaxially-oriented. More typically, however, the second optical layers 14 have an isotropic index of refraction which is different from at least one of the indices of refraction of the first optical layers 12 after orientation. The methods of manufacture and use, as well as design considerations for the multilayered polymer films 10 are described in detail in U.S. patent application Ser. No. 08/402,041 entitled "Multilayered Optical Film", U.S. patent application entitled "Modified Copolyesters and Improved Multilayer Reflective Films", filed on on even date by applicants under Attorney Docket No. 53550USA6A, and U.S. patent application entitled "Process for Making Multilayer Optical Film" filed on even date by applicants under Attorney Docket No. 51932USA8A, all of which are herein incorporated by reference. Although, the present invention will be primarily exemplified by films 10 with second optical layers 14 which have an isotropic index of refraction, the principles and examples described herein may be applied to multilayered films with second optical layers 14 that are birefringent, as described in U.S. patent application entitled "Optical Film and Process for the Manufacture Thereof" filed on even date by applicants under Attorney Docket No. 53546USA5A, incorporated herein by reference.

Additional sets of optical layers, similar to the first and second optical layers 12, 14, may also be used in the multilayered film 10. The design principles disclosed herein for the sets of first and second optical layers may be applied to any additional sets of optical layers. Furthermore, it will be appreciated that, although only a single stack 16 is illustrated in FIG. 1, the multilayered film 10 may be made from multiple stacks that are subsequently combined to form the film 10.

The optical layers 12, 14 and, optionally, one or more of the non-optical layers 18 are typically placed one on top of the other to form a stack 16 of layers. Usually the optical layers 12, 14 are arranged as alternating pairs, as shown in FIG. 1, to form a series of interfaces between layers with different optical properties. The optical layers 12, 14 are typically less than 1 Tm thick, although thicker layers may be used. Furthermore, although FIG. 1 shows only six optical layers 12, 14, many multilayered films 10 have a large number of optical layers. Typical multilayered films have about 2 to 5000 optical layers, preferably about 25 to 2000 optical layers, more preferably about 50 to 1500 optical layers, and most preferably about 75 to 1000 optical layers.

The non-optical layers 18 are polymer layers that are disposed within (see FIG. 2) and/or over (see FIG. 1) the stack 16 to protect the optical layers 12, 14 from damage, to aid in the co-extrusion processing, and/or to enhance post-processing mechanical properties. The non-optical layers 18 are often thicker than the optical layers 12, 14. The thickness of the non-optical layers 18 is usually at least two times, preferably at least four times, and more preferably at least ten times, the thickness of the individual optical layers 12, 14. The thickness of the non-optical layers 28 may be manipulated to produce multilayered polymer films having a desired thickness. Typically, one or more of the non-optical layers 18 are placed so that at least a portion of the light to be transmitted, polarized, and/or reflected by the optical layers 12, 14, also travels through the non-optical layers (i.e., the non-optical layers are placed in the path of light which travels through or is reflected by the optical layers 12, 14).

As a non-limiting example, the optical layers 12, 14 and the non-optical layers 18 of the multilayered film 10 may be made using polymers, such as polyesters. The term "polymer" includes polymers and copolymers, as well as polymers and/or copolymers which may be formed in a miscible blend, for example, by coextrusion or by reactions, including, for example, transesterification. Polyesters have carboxylate and glycol subunits which are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules.

The properties of a polymer layer or film vary with the particular choice of monomer molecules. One example of a polyester useful in multilayered optical films is polyethylene naphthalate (PEN) which can be made, for example, by reactions of naphthalene dicarboxylic acid with ethylene glycol.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclohexane cyclooctane dicarboxylic acid; 1,6-cyclohexane dicarboxylic acid and isomers thereof, t-butyl isophthalic acid, tri-mellitic acid, sodium sulfonated isophthalic acid; 2,2'-biphenyl dicarboxylic acid and isomers thereof, and lower alkyl esters of these acids, such as methyl or ethyl esters. The term "lower alkyl" refers, in this context, to C1–C10 straight-chained or branched alkyl groups. Also included within the term "polyester" are polycarbonates which are derived from the reaction of glycol monomer molecules with esters of carbonic acid.

Suitable glycol monomer molecules for use in forming glycol subunits of the polyester layers include ethylene glycol; propylene glycol; 1,4-butanediol and isomers thereof, 1,6-hexanediol; neopentyl glycol; polyethylene glycol; diethylene glycol; tricyclodecanediol; 1,4-cyclohexanedimethanol and isomers thereof, norbornanediol; bicyclo-octanediol; trimethylol propane; pentaerythritol; 1,4-benzenedimethanol and isomers thereof; bisphenol A; 1,8-dihydroxy biphenyl and isomers thereof, and 1,3-bis(2-hydroxyethoxy)benzene.

Non-polyester polymers are also useful in creating polarizer or mirror films. For example, layers made from a polyester such as polyethylene naphthalate may be combined with layers made from an acrylic polymer to form a highly reflective mirror film. In addition, polyether imides may also be used with polyesters, such as PEN, PBT and their copolymers, to generate multilayered optical films. This is an example of polymers which form a miscible blend that may be used as recycled material for a non-optical layer. Other polyester/non-polyester miscible combinations, such as polybutylene terephthalate and polyvinyl chloride, may also be used.

Multilayered optical films may also be made using only non-polyesters. For example, poly(methyl methacrylate) and polyvinylidene fluoride may be used to make layers for a multilayered film. These two polymers are miscible upon blending and can be used when recycled to form non-optical layers. Another non-polyester combination which is also miscible is atactic or syndiotactic polystyrene and polyphenylene oxide. Other combinations may also be used.

Some examples of polymers which may be used in the first optical layers include polyesters, polycarbonates, polyacrylates, polystyrenes, polyphenylene oxides, or combinations thereof. The first optical layers 12 are typically orientable polymer films, such as polyester films, which may be made birefringent by, for example, stretching the first optical layers 12 in a desired direction or directions. The term "birefringent" means that the indices of refraction in orthogonal x, y, and z directions are not all the same. For films or layers in a film, a convenient choice of x, y, and z axes is shown in FIG. 1 in which the x and y axes correspond to the length and width of the film or layer and the z axis corresponds to the thickness of the layer or film. In the embodiment illustrated in FIG. 1, the film 10 has several optical layers 12, 14 which are stacked one on top of the other in the z-direction.

The first optical layers 12 may be uniaxially-oriented, for example, by stretching in a single direction. A second orthogonal direction may be allowed to neck into some value less than its original length. In one embodiment, the direction of stretching substantially corresponds to either the x or y axis shown in FIG. 1. However, other directions may be chosen. A birefringent, uniaxially-oriented layer typically exhibits a difference between the transmission and/or reflection of incident light rays having a plane of polarization parallel to the oriented direction (i.e., stretch direction) and light rays having a plane of polarization parallel to a transverse direction (i.e., a direction orthogonal to the stretch direction). For example, when an orientable polyester film is stretched along the x axis, the typical result is that $n_x \neq n_y$, where $n_x$ and $n_y$ are the indices of refraction for light polarized in a plane parallel to the "x" and "y" axes, respectively. The degree of alteration in the index of refraction along the stretch direction will depend on factors such as the amount of stretching, the stretch rate, the temperature of the film during stretching, the thickness of the film, the variation in the film thickness, and the composition of the film. Typically, the first optical layers 12 have an in-plane birefringence (the absolute value of $n_x-n_y$) after orientation of 0.04 or greater at 632.8 nm, preferably about 0.1 or greater, and more preferably about 0.2 or greater. All birefringence and index of refraction values are reported for 632.8 nm light unless otherwise indicated.

Polyethylene naphthalate (PEN) is an example of a useful material for forming the first optical layers 12 because it is highly birefringent after stretching. The refractive index of PEN for 632.8 nm light polarized in a plane parallel to the stretch direction increases from about 1.62 to as high as about 1.87. Within the visible spectrum, PEN exhibits a birefringence of 0.20 to 0.40 over a wavelength range of 400–700 nm for a typical high orientation stretch (e.g., a material stretched to five or more times its original dimension at a temperature of 130° C. and an initial strain rate of 20%/min).

The bireflingence of a material can be increased by increasing the molecular orientation. Many birefringent materials are crystalline or semicrystalline. The term "crystalline" will be used herein to refer to both crystalline and semicrystalline materials. PEN and other crystalline polyesters, such as polybutylene naphthalate (PBN), polyethylene terephthalate (PET), and polybutylene terephthalate (PBT), are examples of crystalline materials useful in the construction of birefringent film layers, such as is often the case for the first optical layers 12. In addition, some copolymers of PEN, PBN, PET, and PBT are also crystalline or semicrystalline. The addition of a comonomer to PEN, PBN, PET, or PBT may enhance other properties of the material including, for example, adhesion to the second optical layers 14 or the non-optical layers 18 and/or the lowering of the working temperature (i.e., the temperature for extrusion and/or stretching the film).

A polarizer may be made by combining a uniaxially-oriented first optical layer 12 with a second optical layer 14 having an isotropic index of refraction that is approximately equal to one of the in-plane indices of the oriented layer. Alternatively, both optical layers 12, 14 are formed from birefringent polymers and are oriented in a multiple draw process so that the indices of refraction in a single in-plane direction are approximately equal. The interface between the two optical layers 12, 14, in either case, forms a light reflection plane. Light polarized in a plane parallel to the direction in which the indices of refraction of the two layers are approximately equal will be substantially transmitted. Light polarized in a plane parallel to the direction in which the two layers have different indices will be at least partially reflected. The reflectivity can be increased by increasing the number of layers or by increasing the difference in the indices of refraction between the first and second layers 12, 14.

Typically, the highest reflectivity for a particular interface occurs at a wavelength corresponding to twice the combined optical thickness of the pair of optical layers 12, 14 which form the interface. The optical thickness of the two layers is $n_1d_1+n_2d_2$ where $n_1$, $n_2$ are the indices of refraction of the two layers and $d_1$, $d_2$ are the thicknesses of the layers. The layers 12, 14 may each be a quarter wavelength thick or the layers 12, 14 may have different optical thicknesses, so long as the sum of the optical thicknesses is half of a wavelength (or a multiple thereof). A film having a plurality of layers may include layers with different optical thicknesses to increase the reflectivity of the film over a range of wavelengths. For example, a film may include pairs of layers which are individually tuned to achieve optimal reflection of light having particular wavelengths.

Alternatively, the first optical layers 12 may be biaxially-oriented by stretching in two different directions. The stretching of optical layers 12 in the two directions may result in a net symmetrical or asymmetrical stretch in the two chosen orthogonal axes.

One example of the formation of a mirror is the combination of a biaxially-oriented optical layer 12 with a second optical layer 14 having indices of refraction which differ from both the in-plane indices of the biaxially-oriented optical layer 12. The mirror operates by reflecting light having either polarization because of the index of refraction mismatch between the two optical layers 12, 14. Mirrors may also be made using a combination of uniaxially-oriented layers with in-plane indices of refraction which differ significantly. In another embodiment, the first optical layers 12 are not birefringent and a mirror is formed by combining first and second optical layers 12, 14 which have significantly different indices of refraction. Reflection occurs without orientation of the layers. There are other methods and combinations of layers that are known for producing both mirrors and polarizers and which may be used. Those particular combinations discussed above are merely exemplary.

The second optical layers 14 may be prepared with a variety of optical properties depending, at least in part, on the desired operation of the film 10. In one embodiment, the second optical layers 14 are made of a polymer material that does not appreciably optically orient when stretched under conditions which are used to orient the first optical layers 12. Such layers are particularly useful in the formation of reflective polarizing films, because they allow the formation of a stack 16 of layers by, for example, coextrusion, which can then be stretched to orient the first optical layers 12 while the second optical layers 14 remain relatively isotropic. Typically, the index of refraction of the second optical layers 14 is approximately equal to one of the indices of the oriented first optical layers 12 to allow transmission of light with a polarization in a plane parallel to the direction of the matched indices. Preferably, the two approximately equal indices of refraction differ by about 0.05 or less, and more preferably by about 0.02 or less, at 632.8 nm. In one embodiment, the index of refraction of the second optical layers 14 is approximately equal to the index of refraction of the first optical layers 12 prior to stretching.

In other embodiments, the second optical layers 14 are orientable. In some cases, the second optical layers 14 have one in-plane index of refraction that is substantially the same as the corresponding index of refraction of the first optical layers 12 after orientation of the two sets of layers 12, 14, while the other in-plane index of refraction is substantially different than that of the first optical layers 12. In other cases, particularly for mirror applications, both in-plane indices of refraction of the optical layers 12, 14 are substantially different after orientation.

Referring again to FIGS. 1 and 2, one or more of the non-optical layers 18 may be formed as a skin layer over at least one surface of stack 16 as illustrated in FIG. 1, to, for example, protect the optical layers 12, 14 from physical damage during processing and/or afterwards. In addition, one or more of non-optical layers 18 may be formed within the stack 16 of layers, as illustrated in FIG. 2, to, for example, provide greater mechanical strength to the stack or to protect the stack during processing. Combinations of both internal and external non-optical layers 18 may also be used.

The non-optical layers 18 ideally do not significantly participate in the determination of optical properties of the multilayered polymer film 10, at least across the wavelength region of interest. The non-optical layers 18 are typically not birefringent or orientable but in some cases this may not be true. Typically, when the non-optical layers 18 are used as skin layers there will be at least some surface reflection. If the multilayered polymer film 10 is to be a polarizer, the non-optical layers preferably have an index of refraction which is relatively low. This decreases the amount of surface reflection. If the multilayered polymer film 10 is to be a mirror, the non-optical layers 18 preferably have an index of refraction which is high, to increase the reflection of light.

When the non-optical layers 18 are found within the stack 16, there will typically be at least some polarization or reflection of light by the non-optical layers 18 in combination with the optical layers 12, 14 adjacent to the non-optical layers 18. Typically, however, the non-optical layers 18 have a thickness which dictates that light reflected by the non-optical layers 18 within the stack 16 has a wavelength outside the region of interest, for example, in the infrared region for visible light polarizers or mirrors.

Various functional layers or coatings may be added to the films and optical devices of the present invention to alter or improve their physical or chemical properties, particularly along the surface of the film or device. Such layers or coatings may include, for example, slip agents, low adhesion backside materials, conductive layers, antistatic coatings or films, barrier layers, flame retardants, UV stabilizers, abrasion resistant materials, optical coatings, and/or substrates designed to improve the mechanical integrity or strength of the film or device.

Skin layers or coatings may also be added to impart desired barrier properties to the resulting film or device. Thus, for example, barrier films or coatings may be added as skin layers, or as a component in skin layers, to alter the transmissive properties of the film or device towards liquids, such as water or organic solvents, or gases, such as oxygen or carbon dioxide.

Skin layers or coatings may also be added to impart or improve abrasion resistance in the resulting article. Thus, for example, a skin layer comprising particles of silica embedded in a polymer matrix may be added to an optical film produced in accordance with the invention to impart abrasion resistance to the film, provided, of course, that such a layer does not unduly compromise the optical properties required for the application to which the film is directed.

Skin layers or coatings may also be added to impart or improve puncture and/or tear resistance in the resulting article. Factors to be considered in selecting a material for a tear resistant layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of inter-diffusion between materials in the skin and optical layers, viscoelastic response, relaxation and crystallization behavior under draw conditions, thermal stability at use temperatures, weatherability, ability to adhere to coatings and permeability to various gases and solvents. Puncture or tear resistant skin layers may be applied during the manufacturing process or later coated onto or laminated to the multilayered polymer film 10. Adhering these layers to the film during the manufacturing process, such as by a coextrusion process, provides the advantage that the film is protected during the manufacturing process. In some embodiments, one or more puncture or tear resistant layers may be provided within the film, either alone or in combination with a puncture or tear resistant skin layer.

The films and optical devices of the present invention may be given good slip properties by treating them with low friction coatings or slip agents, such as polymer beads coated onto the surface. Alternately, the morphology of the surfaces of these materials may be modified, as through manipulation of extrusion conditions, to impart a slippery surface to the film; methods by which surface morphology may be so modified are described in U.S. patent application Ser. No. 08/612,710.

In some applications, as where the multilayered polymer films 10 of the present invention are to be used as a component in adhesive tapes, it may be desirable to treat the films with low adhesion backsize (LAB) coatings or films such as those based on urethane, silicone or fluorocarbon chemistry. Films treated in this manner will exhibit proper release properties towards pressure sensitive adhesives (PSAs), thereby enabling them to be treated with adhesive and wound into rolls. Adhesive tapes made in this manner can be used for decorative purposes or in any application where a diffusely reflective or transmissive surface on the tape is desirable.

The films and optical devices of the present invention may also be provided with one or more conductive layers. Such conductive layers may include metals such as silver, gold, copper, aluminum, chromium, nickel, tin, and titanium, metal alloys such as silver alloys, stainless steel, and inconel, and semiconductor metal oxides such as doped and undoped tin oxides, zinc oxide, and indium tin oxide (ITO).

The films and optical devices of the present invention may also be provided with antistatic coatings or films. Such coatings or films include, for example, $V_2O_5$ and salts of sulfonic acid polymers, carbon or other conductive metal layers.

The films and devices of the present invention may also be provided with one or more barrier films or coatings that alter the transmissive properties of the film towards certain liquids or gases. Thus, for example, the devices and films of the present invention may be provided with films or coatings that inhibit the transmission of water vapor, organic solvents, $O_2$, or $CO_2$ through the film. Barrier coatings may be particularly desirable in high humidity environments, where components of the film or device may be subject to distortion due to moisture permeation.

The films and optical devices of the present invention may also be treated with flame retardants, particularly when used in environments, such as on airplanes, that are subject to strict fire codes. Suitable flame retardants include aluminum trihydrate, antimony trioxide, antimony pentoxide, and flame retarding organophosphate compounds.

The films and optical devices of the present invention may also be provided with abrasion-resistant or hard coatings, which may be applied as a skin layer. These include acrylic hardcoats such as Acryloid A-11 and Paraloid K-120N, available from Rohm & Haas, Philadelphia, Pa.; urethane acrylates, such as those described in U.S. Pat. No. 4,249,011 and those available from Sartomer Corp., Westchester, Pa.; and urethane hardcoats obtained from the reaction of an aliphatic polyisocyanate (e.g., Desmodur N-3300, available from Miles, Inc., Pittsburgh, Pa.) with a polyester (e.g., Tone Polyol 0305, available from Union Carbide, Houston, Tex.).

The films and optical devices of the present invention may further be laminated to rigid or semi-rigid substrates, such as, for example, glass, metal, acrylic, polyester, and other polymer backings to provide structural rigidity, weatherability, or easier handling. For example, the multilayered polymer films 10 may be laminated to a thin acrylic or metal backing so that it can be stamped or otherwise formed and maintained in a desired shape. For some applications, such as when the film is applied to other breakable backings, an additional layer comprising PET film or puncture-tear resistant film may be used.

The films and optical devices of the present invention may also be provided with shatter resistant films and coatings. Films and coatings suitable for this purpose are described, for example, in publications EP 592284 and EP 591055, and are available commercially from 3M Company, St. Paul, Minn.

Various optical layers, materials, and devices may also be applied to, or used in conjunction with, the films and devices of the present invention for specific applications. These include, but are not limited to, magnetic or magneto-optic coatings or films; liquid crystal panels, such as those used in display panels and privacy windows; photographic emulsions; fabrics; prismatic films, such as linear Fresnel lenses; brightness enhancement films; holographic films or images; embossable films; anti-tamper films or coatings; IR transparent films for low emissivity applications; release films or release coated paper; and polarizers or mirrors.

Multiple additional layers on one or both major surfaces of the multilayered polymer film 10 are contemplated, and can be any combination of the aforementioned coatings or films. For example, when an adhesive is applied to the multilayered polymer film 10, the adhesive may contain a white pigment such as titanium dioxide to increase the overall reflectivity, or it may be optically transparent to allow the reflectivity of the substrate to add to the reflectivity of the multilayered polymer film 10.

In order to improve roll formation and convertibility of the film, the multilayered polymer films 10 of the present invention may also include a slip agent that is incorporated into the film or added as a separate coating. In most applications, slip agents are added to only one side of the film, ideally the side facing the rigid substrate in order to minimize haze.

The films and other optical devices made in accordance with the invention may also include one or more anti-reflective layers or coatings, such as, for example, conventional vacuum coated dielectric metal oxide or metal/metal oxide optical films, silica sol gel coatings, and coated or coextruded anti-reflective layers such as those derived from low index fluoropolymers such as THV, an extrudable fluoropolymer available from 3M Company (St. Paul, Minn.). Such layers or coatings, which may or may not be polarization sensitive, serve to increase transmission and to reduce reflective glare, and may be imparted to the films and optical devices of the present invention through appropriate surface treatment, such as coating or sputter etching.

The films and other optical devices made in accordance with the invention may be provided with a film or coating which imparts anti-fogging properties. In some cases, an anti-reflection layer as described above will serve the dual purpose of imparting both anti-reflection and anti-fogging properties to the film or device. Various anti-fogging agents are known to the art. Typically, however, these materials include substances, such as fatty acid esters, which impart hydrophobic properties to the film surface and which promote the formation of a continuous, less opaque film of water.

Coatings which reduce the tendency for surfaces to "fog" have been reported by several inventors. For example, U.S. Pat. No. 3,212,909 to Leigh discloses the use of ammonium soap, such as alkyl ammonium carboxylates in admixture with a surface active agent which is a sulfated or sulfonated fatty material, to produce a anti-fogging composition. U.S. Pat. No. 3,075,228 to Elias discloses the use of salts of sulfated alkyl aryloxypolyalkoxy alcohol, as well as alkylbenzene sulfonates, to produce an anti-fogging article useful in cleaning and imparting anti-fogging properties to various surfaces. U.S. Pat. No. 3,819,522 to Zmoda, discloses the use of surfactant combinations comprising derivatives of decyne diol as well as surfactant mixtures which include ethoxylated alkyl sulfates in an anti-fogging window cleaner surfactant mixture. Japanese Patent Kokai No. Hei 6[1994] 41,335 discloses a clouding and drip preventive composition comprising colloidal alumina, colloidal silica and an anionic surfactant. U.S. Pat. No. 4,478,909 (Taniguchi et al) discloses a cured anti-fogging coating film which comprises polyvinyl alcohol, a finely divided silica, and an organic silicon compound, the carbon/silicon weight ratio apparently being important to the film's reported anti-fogging properties. Various surfactants, include fluorine-containing surfactants, may be used to improve the surface smoothness of the coating. Other anti-fog coatings incorporating surfactants are described in U.S. Pat. Nos. 2,803,552; 3,022,178; and 3,897,356. PCT 96/18,691 (Scholtz et al) discloses means by which coatings may impart both anti-fog and anti-reflective properties.

The films and optical devices of the present invention may be protected from UV radiation through the use of UV stabilized films or coatings. Suitable UV stabilized films and coatings include those which incorporate benzotriazoles or hindered amine light stabilizers (HALS) such as Tinuvin™ 292, both of which are available commercially from Ciba Geigy Corp., Hawthorne, N.Y. Other suitable UV stabilized films and coatings include those which contain benzophenones or diphenyl acrylates, available commercially from BASF Corp., Parsippany, N.J. Such films or coatings may be particularly desirable when the films and optical devices of the present invention are used in outdoor applications or in luminaires where the source emits significant amount of light in the UV region of the spectrum.

The films and optical devices of the present invention may be treated with inks, dyes, or pigments to alter their appearance or to customize them for specific applications. Thus, for example, the films may be treated with inks or other printed indicia such as those used to display product identification, advertisements, warnings, decoration, or other information. Various techniques may be used to print on the film, such as screen printing, letterpress, offset, flexographic printing, stipple printing, laser printing, and so forth, and various types of ink can be used, including one and two component inks, oxidatively drying and UV-drying inks, dissolved inks, dispersed inks, and 100% ink systems. In addition, dyes or pigments may be blended into a polymer either by incorporating into one or more of the resins before melt processing or by adding to the polymer melt during the extrusion process to make a film.

The appearance of the multilayered polymer film 10 may also be altered by coloring the film, such as by laminating a dyed film to the multilayered polymer film, applying a pigmented coating to the surface of the film, or including a pigment in one or more of the materials used to make the film.

Both visible and near IR dyes and pigments are contemplated in the present invention, and include, for example, optical brighteners such as dyes that absorb in the UV and fluoresce in the visible region of the color spectrum. Other additional layers that may be added to alter the appearance of the optical film include, for example, opacifying (black) layers, diffusing layers, holographic images or holographic diffusers, and metal layers. Each of these may be applied directly to one or both surfaces of film, or may be a component of a second film or foil construction that is laminated to the film. Alternately, some components such as opacifying or diffusing agents, or colored pigments, may be included in an adhesive layer which is used to laminate the film to another surface.

The films and devices of the present invention may also be provided with metal coatings. Thus, for example, a metallic layer may be applied directly to the optical film by pyrolysis, powder coating, vapor deposition, cathode sputtering, ion plating, and the like. Metal foils or rigid metal plates may also be laminated to the optical film, or separate polymeric films or glass or plastic sheets may be first metallized using the aforementioned techniques and then laminated to the films and devices of the present invention.

Typically, skin layers or coatings, other than non-optical layers 18, are either removed before the film 10 is recycled or are compatible with incorporation into the polymers used in the film 10. These additional coatings, additives, or skin layers may otherwise make the films unrecyclable. In addition, in some cases, the recyclable material is removed prior to the addition of these skin layers or coatings.

In a number of embodiments, the first optical layers 12 are made from a crystalline polyester. Preferred crystalline polyesters include polyethylene naphthalate (PEN) polybutylene naphthalate (PBN), polyethylene terephthalate (PET), polybutylene terephthalate (PBT), and copolymers thereof, although other polymers may also be used. Other carboxylate and/or glycol subunits may be included in the polyester forming, for example, a coPEN. The addition of these subunits may, for example, increase adhesion between the optical layers 12, 14 and/or decrease the glass transition temperature of the material of the first optical layers 12, thereby decreasing the temperature at which the film is extruded and stretched (i.e., the working temperature). Examples of suitable carboxylate and glycol subunits are listed above. One example of suitable polyester for the first optical layers 12 includes 70 to 100 mol % naphthalate (for PEN or PBN) or terephthalate (for PET or PBT), and preferably 85 to 100 mol % naphthalate (PEN or PBN) or terephthalate (PET or PBT).

If the polyester material of the first optical layers 12 contains more than one type of carboxylate subunit, then the polyester may be a block copolyester to enhance adhesion to other layers (e.g., the second optical layers 14 or non-optical layers 18) made from block copolymers having similar blocks. Random copolyesters may also be used.

Examples of materials for forming the second optical layers 14 are copolymers of PEN, PBN, PET and PBT, however, other polymers may be used as described above. The copolymers of PEN, PBN, PET, and PBT include one or more additional carboxylate and/or glycol subunits. More than two different types of carboxylate and/or glycol subunits may also be used. Preferably, this polyester is a random copolyester, however, block copolyesters may be used. Suitable carboxylate and glycol subunits are described above. One particular example of a suitable polyester for the second optical layers 14 contains about 20 to 80 mol % naphthalate (PEN or PBN) or terephthalate (PET or PBT)

subunits, 10 to 80 mol % of a second carboxylate subunit, and 0 to 30 mol % of a third carboxylate subunits.

Another type of useful copolyester includes cyclohexane dicarboxylate subunits. These copolyesters are especially useful as low refractive index polymers due to their viscoelastic properties which enable stable multilayer coextrusion with polyethylene naphthalate in the first optical layers 12. In contrast, some other aliphatic copolyesters with low refractive indices do not have the rheological properties necessary to provide stable melt flow when coextruded in a multilayer melt manifold with polyethylene naphthalate. Cyclohexane dicarboxylate also may provide improved thermal stability over other low refractive index copolyesters during coextrusion.

Tertiary-butyl isophthalate is a preferred carboxylate subunit for use with cyclohexane dicarboxylate in effectively improving glass transition temperature and modulus of the copolyester without substantially increasing the refractive indices. Tertiary-butyl isophthalate enables copolyesters of cyclohexane dicarboxylate to have glass transition temperatures above room temperature with refractive indices as low as 1.51 at 632.8 nm. Utilizing branching monomers such as trimethylol propane enables high viscosity polymers to be synthesized from these monomers without the need for large amounts of catalyst or long reaction times, which improves color and clarity of the polymer. Thus, non-birefringent copolyesters with low refractive indices may be produced with cyclohexane dicarboxylate and tertiary-butyl isophthalate providing the carboxylate subunits, and ethylene glycol and trimethylol propane providing the glycol subunits. These copolyesters are useful for making multilayer optical films which retain their physical properties at room temperature.

Copolyesters made using naphthalene dicarboxylate and cyclohexane dicarboxylate as carboxylates can be coextruded with polyethylene naphthalate to form a multilayered polymer film with good interlayer adhesion. Scrap from this multilayer optical film may be ground into flake and extruded in a twin screw extruder, where it mixes well and transesterifies to form a new copolyester with higher naphthalate content. This scrap may be recycled.

There are a variety of other copolyesters that may be used for making the first and second optical layers 12, 14. Additional examples of suitable coPENs for use in these layers are found in U.S. patent application entitled "Modified Copolyesters and Improved Multilayer Optical Films", filed on even date by applicants under Attorney Docket No. 53550USA6A, incorporated herein by reference.

The non-optical layers 18 may also be made from copolyesters similar to the second optical layers 14, using similar materials and similar amounts of each material. In addition, other polymers may also be used, as described above with respect to the second optical layers 14. It has been found that the use of coPEN (i.e., a copolymer of PEN) or other copolymer material for skin layers (as seen in FIG. 1) reduces the splittiness (i.e., the breaking apart of a film due to strain-induced crystallinity and alignment of a majority of the polymer molecules in the direction of orientation) of the multilayered polymer film 10, because the coPEN of the skin layers orients very little when stretched under the conditions used to orient the first optical layers 12.

Preferably, the polyesters of the first optical layers 12, the second optical layers 14, and the non-optical layers 18 are chosen to have similar rheological properties (e.g., melt viscosities and elasticities) so that they can be co-extruded. Typically, the second optical layers 14 and the non-optical layers 18 have a glass transition temperature, $T_g$, that is either below or no greater than about 40° C. above the glass transition temperature of the first optical layers 12. Preferably, the glass transition temperature of the second optical layers 14 and the non-optical layers 18 is below the glass transition temperature of the first optical layers 12.

A brief description of one method for forming multilayer polymer films is described. A fuller description of the process conditions and considerations is found in U.S. patent application entitled "Process for Making Multilayer Optical Film" filed on even date by applicants Attorney Docket No. 51932USA8A, which is incorporated herein by reference. The multilayer polymer films are formed by extrusion of polymers to be used in the first and second optical layers, as well as the non-optical layers. Extrusion conditions are chosen to adequately feed, melt, mix and pump the polymer resin feed streams in a continuous and stable manner. Final melt stream temperatures are chosen to be within a range which reduces freezing, crystallization or unduly high pressure drops at the low end of the range and which reduces degradation at the high end of the range. The entire melt stream processing of more than one polymer, up to and including film casting on a chill roll, is often referred to as co-extrusion.

Following extrusion, each melt stream is conveyed through a filter into a gear pump used to regulate the continuous and uniform rate of polymer flow. A static mixing unit may be placed at the end of a neck tube to carry the polymer melt stream from the gear pump into a multilayer feedblock with uniform melt stream temperature. The entire melt stream is typically heated as uniformly as possible to enhance both uniform flow of the melt stream and reduce degradation during melt processing.

Multilayer feedblocks divide each of two or more polymer melt streams into many layers, interleave these layers, and combine the many layers into a single multilayer stream. The layers from any given melt stream are created by sequentially bleeding off part of the stream from a main flow channel into side channel tubes which lead to layer slots in the feed block manifold. The layer flow is often controlled by choices made in machinery, as well as the shape and physical dimensions of the individual side channel tubes and layer slots.

The side channel tubes and layer slots of the two or more melt streams are often interleaved to, for example, form alternating layers. The feedblock's downstream-side manifold is often shaped to compress and uniformly spread the layers of the combined multilayer stack transversely. Thick, non-optical layers, known as protective boundary layers (PBLs), may be fed near the manifold walls using the melt streams of the optical multilayer stack, or by a separate melt stream. As described above, these non-optical layers may be used to protect the thinner optical layers from the effects of wall stress and possible resulting flow instabilities.

The multilayer stack exiting the feedblock manifold may then enter a final shaping unit such as a die. Alternatively, the stream may be split, preferably normal to the layers in the stack, to form two or more multilayer streams that may be recombined by stacking. The stream may also be split at an angle other than normal to the layers. A flow channeling system that splits and stacks the streams is called a multiplier. The width of the split streams (i.e., the sum of the thicknesses of the individual layers) can be equal or unequal. The multiplier ratio is defined as the ratio of the wider to narrower stream widths. Unequal streams widths (i.e., multiplier ratios greater than unity) can be useful in creating layer thickness gradients. In the case of unequal stream widths, the multiplier may spread the narrower stream and/or compress the wider stream transversely to ensure matching layer widths upon stacking.

Prior to multiplication, additional non-optical layers can be added to the multilayer stack. These non-optical layers may perform as PBLs within the multiplier. After multiplication and stacking, some of these layers may form internal boundary layers between optical layers, while others form skin layers.

After multiplication, the web is directed to the final shaping unit. The web is then cast onto a chill roll, sometimes also referred to as a casting wheel or casting drum. This casting is often assisted by electrostatic pinning, the details of which are well-known in the art of polymer film manufacture. The web may be cast to a uniform thickness across the web or a deliberate profiling of the web thickness may be induced using die lip controls.

The multilayer web is then drawn to produce the final multilayer optical film. In one exemplary method for making a multilayer optical polarizer, a single drawing step is used. This process may be performed in a tenter or a length orienter. Typical tenters draw transversely (TD) to the web path, although certain tenters are equipped with mechanisms to draw or relax (shrink) the film dimensionally in the web path or machine direction (MD). Thus, in this exemplary method, a film is drawn in one in-plane direction. The second in-plane dimension is either held constant as in a conventional tenter, or is allowed to neck in to a smaller width as in a length orienter. Such necking in may be substantial and increase with draw ratio.

In one exemplary method for making a multilayer mirror, a two step drawing process is used to orient the birefringent material in both in-plane directions. The draw processes may be any combination of the single step processes described that allow drawing in two in-plane directions. In addition, a tenter that allows drawing along MD, e.g. a biaxial tenter which can draw in two directions sequentially or simultaneously, may be used. In this latter case, a single biaxial draw process may be used.

In still another method for making a multilayer polarizer, a multiple drawing process is used that exploits the different behavior of the various materials to the individual drawing steps to make the different layers comprising the different materials within a single coextruded multilayer film possess different degrees and types of orientation relative to each other. Mirrors can also be formed in this manner.

One embodiment of the invention is a multilayer polymer film 10 in which the non-optical layers 18 are made from a mixture of the polymers in the first optical layers 12, second optical layers 14, and non-optical layers 18. Preferably, this mixture of polymers is in the same proportions as the occurrence of the polymers in the multilayer film 10 taken as a whole. Typically, the polymers of the first optical layers 12, second optical layers 14, and non-optical layers 18 are formed of polymers which are miscible and more preferably can be combined by, for example, chemical reactions, such as transesterification, to form a single polymer either by heating, extrusion or some other mechanism. In this way, scrap material from previously manufactured multilayered films 10 may be incorporated in forming the non-optical layers 18 of subsequent multilayered polymer films 10.

By way of non-limiting examples, the composition of multilayered polymer films 10 for use in recycling material and the use of recycled material in non-optical layers 18 will be discussed with reference to polyester layers. However, it will be understood that the same principles can be applied to multilayered polymer films made using other polymers including those polymers discussed above.

One embodiment of the invention is a multilayered polymer film 10 made from polyester materials in which the non-optical layers 18 have the same ratio of carboxylate subunits as the stack 16 of layers, taken as a whole. For example, if the stack 16 includes a number of first optical layers 12 which are made from PEN (i.e., the carboxylate units are 100% naphthalate) and an equal number of second optical layers 14 made from a coPEN having 80 mol % cyclohexane dicarboxylate subunits and 20 mol % naphthalate subunits, where the total molar amounts of carboxylate subunits are equal in the optical layers, then the corresponding non-optical layers, in this embodiment, should have 60 mol % naphthalate subunits and 40 mol % cyclohexane dicarboxylate subunits (i.e., the average molar percentages of the first and second optical layers 12, 14).

In general, the optical layers 12, 14 may not have equal molar amounts of carboxylate subunits. However, the composition of the non-optical layers 18 can still be determined by calculations that take into account the composition, thickness, density, and molecular weights of the polyesters used in the optical layers 12, 14.

The advantage of having a formulation of the non-optical layers 18 that has the same ratio of carboxylate units as the stack 16, taken as a whole, is that scrap material left after the manufacture of a multilayered polymer film, due to cutting, trimming, start-up and shut-down processes, out-of-spec materials, and process upsets, can be recycled and directly used in the non-optical layers 18 of subsequent films. The recycled material has the correct formulation for use in the non-optical layers 18. The different polymeric compositions of the layers of recycled material can often be mixed in the extruder to form, for example, a relatively uniform block or random copolymer by heating to transesterify the recycled polyester material. Recycling scrap material reduces waste and may decrease manufacturing costs because fewer raw materials are needed to make the multilayered polymer films.

The polymer used to form a non-optical layer 18 is preferably a single optical phase material or includes small enough microphases that scattering and other optical phenomena are limited so that the layer is transparent over the wavelength range of interest. An example of such a collection of microphases is a semicrystalline polymer having microcrystallized and non-crystalline domains such as those obtained via a drawing and strain-induced crystallization process. Low levels of haze may result from such small crystals. Thus, a single optical phase material used in a thick enough layer (relative to the desired wavelength range of a particular optical film) forms a non-optical layer.

In general, polyesters can be induced to transesterify at high temperatures and/or long residence times within a mixing unit, such as an extruder. Thus, a blend of two or more polyesters and/or polycarbonates, as might result from the recycling of a multilayered polymer film, may be mixed and reacted by transesterification. If the polyesters are initially immiscible, sufficient transesterification may be needed to create a single optical phase material; otherwise, initially miscible polyesters need only be mixed to form such a phase. A single optical phase material may be made from a variety of transesterified, intermediate copolymers of the noted polyesters, in some cases including the homopolymers themselves.

A recyclable single optical phase material may also be formed by blending polyesters with non-polyesters or by blending non-polyesters together, so long as a single optical phase material is formed prior to final film processing. Thus, any combination of miscible polymers, or combinations of polymers whose reaction products become miscible, forms a single optical phase material under suitable mixing and/or reaction processing conditions. Examples of miscible polymer pairs include: poly(methyl methacrylate) with polyvinylidene fluoride and atactic or syndiotactic polystyrene with polyphenylene oxide. This list is illustrative and should not be construed as limiting.

In some cases, it may be necessary to add a process aid material, such as a polymer with a high glass transition temperature to the recycled material to, for example, increase the glass transition temperature of the non-optical layers 18 to prevent tacking to film orienting equipment such as the length orienter rolls or tenter clips. Another example of a suitable process aid material is a material that decreases the glass transition temperature or crystallinity of the non-optical layers 18 to decrease the orientation of the material forming the non-optical layers 18. Suitable process aid materials for addition to the recycled material include polyimides, polycarbonates, PET, PEN, or copolymers thereof Typically, the amount of process aid material is about 50 wt. % or less of the non-optical layer polymer, preferably about 20 wt. % or less, and more preferably 15 wt. % or less.

In another embodiment, the first optical layers 12 and the second optical layers, 14 are made from polyesters which include one or more glycol subunits; the glycol subunits of the first and second optical layers need not be the same. The non-optical layers 18 are made from a polyester which has glycol subunits in the same relative proportions of the glycol subunits in the stack of layers 16. For example, if the first optical layers 12 are made from PEN (i.e., 100% ethylene glycol subunits) and the second optical layers 14 are made from a coPBN (e.g., 100% butylene glycol subunits), and the optical layers contain equal amounts of glycol subunits, then the non-optical layers may be made from a polyester with 50% ethylene glycol subunits and 50% butylene glycol subunits.

A further embodiment includes non-optical layers 18 made from a polyester with the same relative proportions of both glycol subunits and carboxylate subunits as a stack 16 in which the optical layers 12, 14 are made from polyesters which each contain one or more carboxylate subunits and one or more glycol subunits.

In another embodiment, the non-optical layers 18 do not have the same ratio of carboxylate and/or glycol subunits as the stack, however scrap material from the manufacture of polymer films may still be used for non-optical layers 18 in subsequent films. The scrap material may be combined with other new and/or recycled material in the right proportions to generate the desired non-optical layer composition.

As an illustrative example, a multilayered polymer film may be formed with non-optical layers that are made from a polyester having 70 mol % naphthalate subunits and 30 mol % isophthalate subunits; first optical layers that are made from a polyester having 100 mol % naphthalate subunits; and second optical layers that are made from a polyester having 70 mol % naphthalate subunits and 30 mol % isophthalate subunits. Assuming, that the non-optical layers, first optical layers, and second optical layers all have the same molar amount of carboxylate subunits, the resulting scrap has 80 mol % naphthalate subunits and 20 mol % isophthalate subunits. This scrap material can be combined in a 2:1 molar ratio with a polyester having 50 mol % naphthalate subunits and 50 mol % isophthalate subunits to form the desired non-optical layer composition for use in manufacturing subsequent multilayered polymer films. The ratio of scrap material to added material will depend on the composition of the two materials, the density of each, and the molecular weights of the respective polymers.

In general, the optical layers 12, 14 and the non-optical layers 18 will not have equal molar amounts of carboxylate subunits. However, the ratio of recycled material to additional material that is needed to generate a desired non-optical layer composition can still be determined by calculations that account for the composition, thickness, density, and number of layers, as well as the molecular weights of the polyesters used in the optical layers 12, 14 and the non-optical layers 18.

Multilayered polymer films with non-optical layers that are formed directly from scrap materials obtained from prior-manufactured multilayered polymer films or with the addition of other polymer material provide a convenient way to use scrap material. This may reduce waste and save manufacturing costs. Furthermore, the scrap material may be used to form other films that do not have the same composition or sets of layers as the multilayered films from which the scrap material originated.

The following examples demonstrate the manufacture and uses of multilayered polymer films of the invention. It is to be understood that these examples are merely illustrative and are in no way to be interpreted as limiting the scope of the invention.

EXAMPLES

Monomers, catalysts, and stabilizers utilized in creating polymers for these examples are commercially available from the following suppliers: dimethyl naphthalene dicarboxylate and terephthalic acid from Amoco (Decatur, Ala.), dimethyl terephthalate from Hoechst Celanese (Dallas, Tex.), dimethyl isophthalate and dimethyl tertiary-butyl isophthalate from Morflex Inc. (Greensboro, N.C.), ethylene glycol from Union Carbide (Charleston, W. Va.), 1,6-hexanediol from BASF (Charlotte, N.C.), sebacic acid from Union Camp (Dover, Ohio), antimony triacetate from Elf Atochem (Philadelphia, Pa.), cobalt acetate and manganese acetate from Hall Chemical (Wickliffe, Ohio), triethyl phosphonoacetate from Albright & Wilson (Glen Allen, Va.), dimethyl cyclohexane dicarboxylate from Eastman Chemical Co. (Kingsport, Tenn.), and triethylamine from Air Products (Phillipsburg, N.J.).

In each of the examples described below, an 836 layer film was formed unless otherwise indicated. The 836 optical layer construction included four multilayer optical stacks with graded layer thicknesses as obtained by the double multiplication of a 209 layer construction from a multilayer feed block. The optical layers accounted for approximately 50 percent of the thickness of the construction. Each of the stacks was separated by one of three non-optical internal protective boundary layers, each accounting for about 2% of the total thickness. Finally, each side of the film possessed an outer non-optical skin layer, each accounting for approximately 22% of the thickness.

Example 1

A multilayer reflective polarizer film was constructed with first optical layers created from polyethylene naphthalate (PEN) and second optical layers created from a co(polyethylene naphthalate) (coPEN) having carboxylate subunits derived from 70 mol % dimethyl naphthalene dicarboxylate (NDC) and 30 mol % dimethyl isophthalate and glycol subunits derived from 100 mol % ethylene glycol.

The PEN used to form the first optical layers was synthesized in a batch reactor with the following raw material charge: 136 kg dimethyl naphthalene dicarboxylate, 73 kg ethylene glycol, 27 g manganese acetate, 27 g cobalt acetate, and 48 g antimony triacetate. Under pressure of 2 atm, this mixture was heated to 254° C. while removing the transesterification reaction by-product, methanol. After 35 kg of methanol was removed, 49 g of triethyl phosphonoacetate was charged to the reactor and then the pressure was gradually reduced to 1 torr while heating to 290° C. The condensation reaction by-product, ethylene glycol, was continuously removed until a polymer with an intrinsic viscosity of 0.48 dL/g, as measured in 60/40 wt. % phenol/o-dichlorobenzene, was produced.

The coPEN used to form the second optical layers was synthesized in a batch reactor with the following raw material charge: 109 kg dimethyl naphthalene dicarboxylate, 37 kg dimethyl isophthalate, 79 kg ethylene glycol, 29 g manganese acetate, 29 g cobalt acetate, and 58 g antimony triacetate. Under pressure of 2 atm, this mixture was heated to 254° C. while removing the transesterification reaction by-product, methanol. After 41 kg of methanol was removed, 52 g of triethyl phosphonoacetate was charged to the reactor and than the pressure was gradually reduced to 1 torr while heating to 290° C. The condensation reaction by-product, ethylene glycol, was continuously stripped until a polymer with an intrinsic viscosity of 0.57 dL/g, as measured in 60/40 wt. % phenol/o-dichlorobenzene, was produced.

The above described PEN and coPEN were then coextruded through a multilayer melt manifold to create a multilayer film with 836 alternating first and second optical layers. The multilayer reflective film also contained internal protective layers and external protective layers (i.e. non-optical layers) made from the same coPEN as the second optical layers. The internal and external optical layers were introduced through additional melt ports. This cast film was heated in an oven charged with hot air set at 150° C. for about one minute and then uniaxially oriented at a 6:1 draw to produce a reflective polarizer of approximately 125 Tm thickness.

When the described multilayer reflective film was ground into flake and extruded a second time (i.e., recycled) with a twin screw extruder, the PEN and coPEN layers melted, mixed, and transesterified to create a new recycled co(polyethylene naphthalate) having carboxylate subunits derived from 83 mol % dimethyl naphthalene dicarboxylate and 17 mol % dimethyl isophthalate, and glycol subunits derived from 100 mol % ethylene glycol. The new co(polyethylene naphthalate) created from the recycled material was then reused for the non-optical external and internal protective layers of subsequent multilayer reflective films.

Example 2

Example 1 may be repeated with the addition to the recycled material of virgin (non-recycled) co(polyethylene naphthalate)(coPEN) having carboxylate subunits derived from 50 mol % dimethyl naphthalene dicarboxylate and 50 mol % dimethyl isophthalate, and glycol subunits derived from 99.8 mol % ethylene glycol and 0.2 mol % trimethylol propane.

The virgin coPEN, used as an additive to the recycled coPEN, is synthesized in a batch reactor with the following raw material charge: 76 kg dimethyl naphthalene dicarboxylate, 61 kg dimethyl isophthalate, 79 kg ethylene glycol, 313 g trimethylol propane, 27 g manganese acetate, 27 g cobalt acetate, and 48 g antimony triacetate. Under pressure of 2 atm, this mixture is heated to 254° C. while removing the transesterification reaction by-product, methanol. After 40 kg of methanol are removed, 49 g of triethyl phosphonoacetate is charged to the reactor and then the pressure is gradually reduced to 1 torr while heating to 290° C. The condensation reaction byproduct, ethylene glycol, is removed until a polymer with an intrinsic viscosity of 0.60 dL/g, as measured in 60/40 wt. % phenol/o-dichlorobenzene, is produced.

This virgin coPEN may be blended with the recycled multilayer reflective film flake and extruded in a twin screw extruder to transesterify and create a new recycled coPEN having carboxylate subunits derived from 70 mol % dimethyl naphthalene dicarboxylate and 30 mol % dimethyl isophthalate and glycol subunits derived from 99.9 mol % ethylene glycol, and 0.1 mol % trimethylol propane. The new coPEN created from recycled materials may then be reused as non-optical external and internal protective layers of subsequent multilayer reflective films.

Example 3

A multilayer reflective polarizer film may be constructed with first optical layers created from a co(polyethylene naphthalate) (coPEN) having carboxylate subunits derived from 90 mol % dimethyl naphthalene dicarboxylate and 10 mol % dimethyl terephthalate and glycol subunits derived from 100 mol % ethylene glycol, and second optical layers created from a coPEN having carboxylate subunits derived from 55 mol % dimethyl naphthalene dicarboxylate and 45 mol % dimethyl isophthalate, and glycol subunits derived from 99.8 mol % ethylene glycol and 0.2 mol % trimethylol propane.

The coPEN used to form the first optical layers is synthesized in a batch reactor with the following raw material charge: 126 kg dimethyl naphthalene dicarboxylate, 11 kg dimethyl terephthalate, 75 kg ethylene glycol, 27 g manganese acetate, 27 g cobalt acetate, and 48 g antimony triacetate. Under pressure of 2 atm, this mixture is heated to 254° C. while removing the transesterification reaction by-product, methanol. After 36 kg of methanol is removed, 49 g of triethyl phosphonoacetate is charged to the reactor and then the pressure is gradually reduced to 1 torr while heating to 290° C. The condensation reaction by-product, ethylene glycol, is continuously removed until a polymer with an intrinsic viscosity of 0.46 dL/g, as measured in 60/40 wt. % phenol/o-dichlorobenzene, is produced.

The coPEN used to form the second optical layers is synthesized in a batch reactor with the following raw material charge: 83 kg dimethyl naphthalene dicarboxylate, 54 kg dimethyl isophthalate, 79 kg ethylene glycol, 313 g trimethylol propane, 27 g manganese acetate, 27 g cobalt acetate, and 48 g antimony triacetate. Under pressure of 2 atm, this mixture is heated to 254° C. while removing the transesterification reaction by-product, methanol. After 39.6 kg of methanol is removed, 49 g of triethyl phosphonoacetate is charged to the reactor and than the pressure is gradually reduced to 1 torr while heating to 290° C. The condensation reaction by-product, ethylene glycol, is continuously stripped until a polymer with an intrinsic viscosity of 0.60 dL/g, as measured in 60/40 wt. % phenol/o-dichlorobenzene, is produced.

The above described coPENs are then coextruded through a multilayer melt manifold to create a multilayer film with 836 alternating first and second optical layers. This particular multilayer reflective film also contains internal protective layers and external protective layers derived from the same coPEN as the second optical layers. This cast film is heated in an oven charged with hot air set at 138° C. for about one minute and then uniaxially oriented at a 6:1 draw to produce a reflective polarizer of approximately 125 Tm thickness.

When the described multilayer reflective film is ground into flake and extruded a second time in a twin screw extruder, the coPEN first layers, coPEN second layers, and coPEN non-optical layers melt, mix, and transesterify to create a new coPEN having carboxylate subunits derived from 70 mol % dimethyl naphthalene dicarboxylate, 25.7 mol % dimethyl isophthalate and 4.3 mol % dimethyl terephthalate, and glycol subunits derived from 99.9 mol % ethylene glycol, and 0.1 mol % trimethylol propane. The new coPEN created from recycled materials may then be reused as non-optical external and/or internal protective layers of subsequent multilayer reflective films.

Example 4

A multilayer reflective polarizer film was constructed with first optical layers created from a coPEN having carboxylate subunits derived from 85 mol % dimethyl naphthalene dicarboxylate and 15 mol % dimethyl terephthalate, and glycol subunits derived from 100 mol % ethylene glycol, and second optical layers created from a coPEN having carboxylate subunits derived from 50 mol % dimethyl naphthalene dicarboxylate and 50 mol % dimethyl isophthalate, and glycol subunits derived from 100 mol % ethylene glycol.

The coPEN used to form the first optical layers was synthesized in a batch reactor with the following raw material charge: 123 kg dimethyl naphthalene dicarboxylate, 17 kg dimethyl terephthalate, 76 kg ethylene glycol, 27 g manganese acetate, 27 g cobalt acetate, and 48 g antimony triacetate. Under pressure of 2 atm, this mixture was heated to 254° C. while removing the transesterification reaction by-product, methanol. After 36 kg of methanol was removed, 49 g of triethyl phosphonoacetate was charged to the reactor and then the pressure was gradually reduced to 1 torr while heating to 290° C. The condensation reaction by-product, ethylene glycol, was continuously removed until a polymer with an intrinsic viscosity of 0.50 dL/g, as measured in 60/40 wt. % phenol/o-dichlorobenzene, was produced.

The coPEN used to form the second optical layers was synthesized in a batch reactor with the following raw material charge: 77 kg dimethyl naphthalene dicarboxylate, 61 kg dimethyl isophthalate, 82 kg ethylene glycol, 27 g manganese acetate, 27 g cobalt acetate, and 48 g antimony triacetate. Under pressure of 2 atm, this mixture was heated to 254° C. while removing the transesterification reaction by-product, methanol. After 39.6 kg of methanol was removed, 49 g of triethyl phosphonoacetate was charged to the reactor and then the pressure was gradually reduced to 1 torr while heating to 290° C. The condensation reaction by-product, ethylene glycol, was continuously stripped until a polymer with an intrinsic viscosity of 0.60 dL/g, as measured in 60/40 wt. % phenol/o-dichlorobenzene, was produced.

The above described coPENs were then coextruded through a multilayer melt manifold to create a multilayer film with 836 alternating first and second optical layers. This particular multilayer reflective film also contained internal protective layers and external protective layers derived from the same coPEN as the second optical layers. This cast film was heated in an oven charged with hot air set at 135° C. for about one minute and then uniaxially oriented at a 6:1 draw to produce a reflective polarizer of approximately 125 Tm thickness.

The described multilayer reflective film may be ground into flake and extruded a second time (recycled) with a twin screw extruder. The coPEN first layers, coPEN second layers, and coPEN non-optical layers melt, mix, and transesterify to create a new recycled coPEN having carboxylate subunits derived from 65 mol % dimethyl naphthalene dicarboxylate, 28.5 mol % dimethyl isophthalate, and 6.5 mol % dimethyl terephthalate. The new coPEN created from recycled materials may then be reused as non-optical external and/or internal protective layers of subsequent multilayer reflective films.

Example 5

A multilayer reflective polarizer film was constructed with first optical layers created from a coPEN having carboxylate subunits derived from 88 mol % dimethyl naphthalene dicarboxylate and 12 mol % dimethyl terephthalate, and glycol subunits derived from 100 mol % ethylene glycol, and second optical layers created from a coPEN having carboxylate subunits derived from 55 mol % dimethyl naphthalene dicarboxylate and 45 mol % dimethyl terephthalate, and glycol subunits derived from 96.8 mol % ethylene glycol, 3 mol % hexanediol, and 0.2 mol % trimethylol propane.

The co(polyethylene naphthalate) used to form the first optical layers was created as a blend of two polymers: a PET (8 wt. %) and a coPEN (92 wt. %). The PET used in the blend was synthesized in a batch reactor with the following raw material charge: 138 kg dimethyl terephthalate, 93 kg ethylene glycol, 27 g zinc acetate, 27 g cobalt acetate, and 48 g antimony triacetate. Under pressure of 2 atm, this mixture was heated to 254° C. while removing the transesterification reaction byproduct, methanol. After 45 kg of methanol was removed 52 g of triethyl phosphonoacetate was charged to the reactor and then the pressure was gradually reduced to 1 torr while heating to 290° C. The condensation reaction by-product, ethylene glycol, was continuously removed until a polymer with an intrinsic viscosity of 0.60, as measured in 60/40 wt. % phenol/o-dichlorobenzene, was produced.

The coPEN used in the blend to form the first optical layers had carboxylate subunits that were derived from 97 mol % dimethyl naphthalene dicarboxylate and 3 mol % dimethyl terephthalate and glycol subunits derived from 100 mol % ethylene glycol. The coPEN was synthesized in a batch reactor with the following raw material charge: 135 kg dimethyl naphthalene dicarboxylate, 3.2 kg dimethyl terephthalate, 75 kg ethylene glycol, 27 g manganese acetate, 27 g cobalt acetate, and 48 g antimony triacetate. Under pressure of 2 atm, this mixture was heated to 254° C. while removing methanol. After 37 kg of methanol was removed, 49 g of triethyl phosphonoacetate was charged to the reactor and than the pressure was gradually reduced to 1 torr while heating to 290° C. The condensation reaction by-product, ethylene glycol, was continuously removed until a polymer with an intrinsic viscosity of 0.50 dL/g, as measured in 60/40 wt. % phenol/o-dichlorobenzene, was produced.

The co(polyethylene naphthalate) used to form the second optical layers was synthesized in a batch reactor with the following raw material charge: 88.5 kg dimethyl naphthalene dicarboxylate, 57.5 kg dimethyl terephthalate, 81 kg ethylene glycol, 4.7 kg hexane diol, 15 grams manganese acetate, 22 grams cobalt acetate, 15 g zinc acetate, 239 g trimethylol propane, and 51 g antimony triacetate. Under pressure of 2 atm, this mixture was heated to 254° C. while removing methanol. After 39.6 kg of methanol was removed, 47 g of triethyl phosphonoacetate was charged to the reactor and than the pressure was gradually reduced to 1 torr while heating to 290° C. The condensation reaction by-product, ethylene glycol, was continuously stripped until a polymer with an intrinsic viscosity of 0.56 dL/g, as measured in 60/40 wt. % phenol/o-dichlorobenzene, was produced.

The above described coPENs were then coextruded through a multilayer melt manifold to create a multilayer film with 836 alternating first and second optical layers. This particular multilayer reflective film also contained internal protective layers and external protective layers derived from the same coPEN as the second optical layers. This cast film was heated in an oven charged with hot air set at 135° C. for about one minute and then uniaxially oriented at a 6:1 draw to produce a reflective polarizer of approximately 125 Tm thickness.

The described multilayer reflective film may be ground into flake and extruded a second time (recycled) with a twin screw extruder. The coPEN first layers, coPEN second layers, and coPEN non-optical layers melt, mix, and transesterify to create a new recycled coPEN having carboxylate subunits derived from 69 mol % dimethyl naphthalene dicarboxylate, and 31 mol % dimethyl terephthalate, and glycol subunits derived from 98.2 mol % ethylene glycol, 1.7 mol % hexanediol, and 0.1 mol % trimethylol propane. The new coPEN created from recycled materials may then be reused as non-optical external and/or internal protective layers of subsequent multilayer reflective films.

Example 6

A multilayer reflective polarizer film was constructed with first optical layers created from a coPEN having carboxylate subunits derived from 85 mol % dimethyl naphthalene dicarboxylate and 15 mol % dimethyl terephthalate, and glycol subunits derived from 100 mol % ethylene glycol, and second optical layers created from a coPEN having carboxylate subunits derived from 55 mol % dimethyl naphthalene dicarboxylate and 45 mol % dimethyl terephthalate, and glycol subunits derived from 96.8 mol % ethylene glycol, 3 mol % hexanediol, and 0.2 mol % trimethylol propane.

The coPEN used to form the first optical layers was synthesized as in Example 4.

The coPEN used to form the second optical layers was synthesized as in Example 5.

The above described coPENs were then coextruded through a multilayer melt manifold to create a multilayer film with 836 alternating first and second optical layers. This particular multilayer reflective film also contained internal protective layers and external protective layers from the same coPEN as the second optical layers. This cast film was heated in an oven charged with hot air set at 135° C. for about one minute and then uniaxially oriented at a 6:1 draw to produce a reflective polarizer of approximately 125 Tm thickness.

The described multilayer reflective film may be ground into flake and extruded a second time with a twin screw extruder. The coPEN first layers, coPEN second layers, and coPEN non-optical layers melt, mix, and transesterify to create a new recycled coPEN having carboxylate subunits derived from 68 mol % dimethyl naphthalene dicarboxylate, and 32 mol % dimethyl terephthalate, and glycol subunits derived from 98.2 mol % ethylene glycol, 1.7 mol % hexanediol, and 0.1 mol % trimethylol propane. The new coPEN created from recycled materials may then be reused as non-optical external and/or internal protective layers of subsequent multilayer reflective films.

Example 7

A multilayer reflective polarizer film was constructed with first optical layers created from a coPEN having carboxylate subunits derived from 85 mol % dimethyl naphthalene dicarboxylate and 15 mol % dimethyl terephthalate, and glycol subunits derived from 100 mol % ethylene glycol, and second optical layers created from a coPEN having carboxylate subunits derived from 50 mol % dimethyl naphthalene dicarboxylate and 50 mol % dimethyl terephthalate, and glycol subunits derived from 96.8 mol % ethylene glycol, 3 mol % hexanediol, and 0.2 mol % trimethylol propane.

The coPEN used to form the first optical layers was synthesized as in Example 4.

The coPEN used to form the second optical layers was synthesized in a batch reactor with the following raw material charge: 81.4 kg dimethyl naphthalene dicarboxylate, 64.5 kg dimethyl terephthalate, 82 kg ethylene glycol, 4.7 kg hexanediol, 15 g manganese acetate, 22 g cobalt acetate, 15 g zinc acetate, 239 g trimethylol propane, and 48 g antimony triacetate. Under pressure of 2 atm, this mixture was heated to 254° C. while removing the transesterification reaction by-product, methanol. After 44 kg of methanol was removed, 47 g of triethyl phosphonoacetate was charged to the reactor and then the pressure was gradually reduced to 1 torr while heating to 290° C. The condensation reaction byproduct, ethylene glycol, was continuously stripped until a polymer with an intrinsic viscosity of 0.55 dL/g, as measured in 60/40 wt. % phenol/o-dichlorobenzene, was produced.

The above described coPENs were then coextruded through a multilayer melt manifold to create a multilayer film with 836 alternating first and second optical layers. This particular multilayer reflective film also contained internal protective layers and external protective layers derived from the same coPEN as the second optical layers. This cast film was heated in an oven charged with hot air set at 135° C. for about one minute and then uniaxially oriented at a 6:1 draw to produce a reflective polarizer of approximately 125 Tm thickness.

The described multilayer reflective film may be ground into flake and extruded a second time (recycled) with a twin screw extruder. The coPEN first layers, coPEN second layers, and coPEN non-optical layers melt, mix, and transesterify to create a new recycled coPEN having carboxylate subunits derived from 65 mol % dimethyl naphthalene dicarboxylate, and 35 mol % dimethyl terephthalate, and glycol subunits derived from 98.2 mol % ethylene glycol, 1.7 mol % hexanediol, and 0.1 mol % trimethylol propane. The new coPEN created from recycled materials may then be reused as non-optical external and/or internal protective layers of subsequent multilayer reflective films.

Example 8

A multilayer reflective film may be constructed with first optical layers created from a coPEN having carboxylate subunits derived from 90 mol % dimethyl naphthalene dicarboxylate and 10 mol % dimethyl terephthalate, and glycol subunits derived from 100 mol % ethylene glycol, and second optical layers created from a coPEN having carboxylate subunits derived from 20 mol % dimethyl naphthalene dicarboxylate and 80 mol % dimethyl cyclohexane dicarboxylate, and glycol subunits derived from 99.8 mol % ethylene glycol and 0.2 mol % trimethylol propane.

The coPEN used to form the first optical layers is synthesized as in Example 3.

The coPEN used to form the second optical layers is synthesized in a batch reactor with the following raw material charge: 32.7 kg dimethyl naphthalene dicarboxylate, 105.5 kg dimethyl cyclohexane dicarboxylate, 83.6 kg ethylene glycol, 34 g manganese acetate, 34 g cobalt acetate, 340 g trimethylol propane, and 96 g antimony triacetate. Under pressure of 2 atm, this mixture is heated to 254° C. while removing the transesterification reaction by-product, methanol. After 43 kg of methanol is removed, 61 g of triethyl phosphonoacetate is charged to the reactor and then the pressure is gradually reduced to 1 torr while heating to 290° C. The condensation reaction by-product, ethylene glycol, is continuously stripped until a polymer with an intrinsic viscosity of 0.90 dL/g, as measured in 60/40 wt. % phenol/o-dichlorobenzene, is produced.

The above described coPENs is then coextruded through multilayer melt manifolds to create a multilayer film with 836 alternating first and second optical layers. This particular multilayer reflective film also contains internal protective layers and external protective layers derived from the same coPEN as the first optical layers and are introduced through additional melt ports. This cast film is biaxially oriented. First, the film is heated in an oven charged with hot air set at 135° C. for about one minute and then oriented at a 3.6:1 draw. Then the film is heated in an oven charged with hot air set at 145° C. for about one minute and then oriented in a transverse direction at a 4.0:1 draw. Subsequently, the biaxially oriented film is heat set at 249° C. for 5–10 seconds. The film reflects visible light and/or infrared light dependent on the range of layer thicknesses created.

When the described multilayer reflective film is ground into flake and extruded a second time with a twin screw extruder, The coPEN first layers, coPEN second layers, and coPEN non-optical layers melt, mix, and transesterify to create a new recycled coPEN having carboxylate subunits derived from 69 mol % dimethyl naphthalene dicarboxylate, 7.0 mol % dimethyl terephthalate and 24 mol % dimethyl cyclohexane dicarboxylate, and glycol subunits derived from 99.94 mol % ethylene glycol, and 0.06 mol % trimethylol propane. The new coPEN created from recycled material may then be reused as non-optical external and/or internal protective layers of subsequent multilayer reflective films.

Example 9

A multilayer reflective film was constructed with first optical layers created from a coPEN having carboxylate subunits derived from 90 mol % dimethyl naphthalene dicarboxylate and 10 mol % dimethyl terephthalate, and glycol subunits derived from 100 mol % ethylene glycol, and second optical layers created from a co(polyethylene terephthalate) (coPET) having carboxylate subunits derived from 50 mol % terephthalic acid and 50 mol % cyclohexane dicarboxylic acid, and glycol subunits derived from 99.8 mol % ethylene glycol and 0.2 mol % trimethylol propane.

The coPEN used to form the first optical layers was synthesized as in Example 3.

The coPEN used to form the second optical layers was synthesized in a batch reactor with the following raw material charge: 58.6 kg terephthalic acid, 59.5 kg cyclohexane dicarboxylic acid, 87.7 kg ethylene glycol, 300 g triethyl amine, 275 g trimethylol propane, and 82 g antimony triacetate. Under pressure of 2 atm, this mixture was heated to 254° C. while removing the esterification reaction by-product, water. After 25.5 kg of water was removed, the pressure was gradually reduced to 1 torr while heating to 290° C. The condensation reaction by-product, ethylene glycol, was continuously stripped until a polymer with an intrinsic viscosity of 1.1 dL/g, as measured in 60/40 wt. % phenol/o-dichlorobenzene, was produced.

The above described coPEN and coPET were then coextruded through multilayer melt manifolds to create a multilayer film with 836 alternating first and second optical layers. This particular multilayer reflective film also contained internal protective layers and external protective layers derived from the same coPEN as the first optical layers and were introduced through additional melt ports. This cast film was biaxially oriented. First, the film is heated in an oven charged with hot air set at 135° C. for about one minute and then oriented at a 3.6:1 draw. Then the film was heated in an oven charged with hot air set at 145° C. for about one minute and then oriented in a transverse direction at a 4.0:1 draw. Subsequently, the biaxially oriented film was heat set at 249° C. for 5–10 seconds. The film thus produced reflected visible light and/or infrared light dependent on the range of layer thicknesses created.

The described multilayer reflective film may be ground into flake and extruded a second time (recycled) with a twin screw extruder. The coPEN first layers and coPET second layers melt, mix, and transesterify to create a new recycled coPEN having carboxylate subunits derived from 63 mol % dimethyl naphthalene dicarboxylate or naphthalic acid, 22.0 mol % dimethyl terephthalate or terephthalic acid, and 15 mol % dimethyl cyclohexane dicarboxylic acid, and glycol subunits derived from 99.94 mol % ethylene glycol and 0.06 mol % trimethylol propane. The new coPEN created from recycled material may be reused as non-optical external and/or internal protective layers of subsequent multilayer reflective films.

Example 10

A multilayer reflective film may be constructed with first optical layers created from coPEN having carboxylate subunits derived from 90 mol % dimethyl naphthalene dicarboxylate and 10 mol % dimethyl terephthalate, and glycol subunits derived from 100 mol % ethylene glycol, and second optical layers created from a co(polyethylene terephthalate) (coPET) having carboxylate subunits derived from 50 mol % terephthalic acid and 50 mol % sebacic acid, and glycol subunits derived from 99.8 mol % ethylene glycol and 0.2 mol % trimethylol propane.

The coPEN used to form the first optical layers is synthesized as in Example 3.

The coPET used to form the second optical layers is synthesized in a batch reactor with the following raw material charge: 53.6 kg terephthalic acid, 66 kg sebacic acid, 83.7 kg ethylene glycol, 300 g triethyl amine, 340 g trimethylol propane, and 80 g antimony triacetate. Under pressure of 2 atm, this mixture is heated to 254° C. while removing the esterification reaction by-product, water. After 23 kg of water is removed, the pressure is gradually reduced to 1 torr while heating to 290° C. The condensation reaction by-product, ethylene glycol, is continuously stripped until a polymer with an intrinsic viscosity of 1.3 dL/g, as measured in 60/40 wt. % phenol/o-dichlorobenzene, is produced.

The above described coPEN and coPET may be coextruded through multilayer melt manifolds to create a multilayer film with 836 alternating first and second optical layers. This particular multilayer reflective film also contains internal protective layers and external protective layers derived from the same coPEN as the first optical layers. These protective layers are introduced through additional melt ports. This cast film is biaxially oriented. First, the film is heated in an oven charged with hot air set at 135° C. for about one minute and then oriented at a 3.6:1 draw. Then the film is heated in an oven charged with hot air set at 145° C. for about one minute and then oriented in a transverse direction at a 4.0:1 draw. Subsequently, the biaxially oriented film is heat set at 249° C. for 5–10 seconds. The film thus produced may reflect visible light and/or infrared light dependent on the range of layer thicknesses created.

When the described multilayer reflective film is ground into flake and extruded a second time with a twin screw extruder, the coPEN first layers and coPET second layers melt, mix, and transesterify to create a new recycled coPEN having carboxylate subunits derived from 63 mol % dimethyl naphthalene dicarboxylate, 22.0 mol % dimethyl terephthalate or terephthalic acid and 15 mol % sebacic dicarboxylate, and glycol subunits derived from 99.94 mol % ethylene glycol and 0.06 mol % trimethylol propane. The new coPEN created from recycled material may then be reused as non-optical external and/or internal protective layers of subsequent multilayer reflective films.

Example 11

A multilayer reflective film may be constructed with first optical layers created from a coPEN having carboxylate subunits derived from 90 mol % dimethyl naphthalene dicarboxylate and 10 mol % dimethyl terephthalate, and glycol subunits derived from 100 mol % ethylene glycol, and second optical layers created from a copolyester having carboxylate subunits derived from 15 mol % dimethyl tertiary-butyl isophthalate and 85 mol % dimethyl cyclohexane dicarboxylate, and glycol subunits derived from 99.7 mol % ethylene glycol and 0.3 mol % trimethylol propane.

The coPEN used to form the first optical layers is synthesized as in Example 3.

The copolyester used to form the second optical layers is synthesized in a batch reactor with the following raw material charge: 25.5 kg dimethyl tertiary-butyl isophthalate, 112 kg dimethyl cyclohexane dicarboxylate, 88 kg ethylene glycol, 34 g cobalt acetate, 27 g manganese acetate, 409 g trimethylol propane, and 82 g antimony triacetate. Under pressure of 2 atm, this mixture is heated to 254° C. while removing the transesterification reaction by-product, methanol. After 43 kg of methanol is removed, 54 g of triethyl phosphonoacetate is charged to the reactor and then the pressure is gradually reduced to 1 torr while heating to 290° C. The condensation reaction byproduct, ethylene glycol, is continuously stripped until a polymer with an intrinsic viscosity of 1.2 dL/g, as measured in 60/40 wt. % phenol/o-dichlorobenzene, is produced.

The above described copolyesters may be coextruded through multilayer melt manifolds to create a multilayer film with 836 alternating first and second optical layers. This particular multilayer reflective film also contains internal protective layers and external protective layers derived from the same coPEN as the first optical layers. These protective layers are introduced through additional melt ports. This cast film is biaxially oriented. First, the film is heated in an oven charged with hot air set at 135° C. for about one minute and then oriented at a 3.6:1 draw. Then the film is heated in an oven charged with hot air set at 145° C. for about one minute and then oriented in a transverse direction at a 4.0:1 draw. Subsequently, the biaxially oriented film is heat set at 249° C. for 5–10 seconds. The film thus produced may reflect visible light and/or infrared light dependent on the range of layer thicknesses created.

The described multilayer reflective film may then be ground into flake and extruded a second time (recycled) with a twin screw extruder. The coPEN first layers, coPEN second layers, and coPEN non-optical layers melt, mix, and transesterify to create a new recycled coPEN having carboxylate subunits derived from 63 mol % dimethyl naphthalene dicarboxylate, 7.0 mol % dimethyl terephthalate, 25.5 mol % dimethyl cyclohexane dicarboxylate, and 4.5 mol % dimethyl tertiary-butyl isophthalate and glycol subunits derived from 99.92 mol % ethylene glycol, and 0.08 mol % trimethylol propane. The new coPEN created from recycled material may then be reused as non-optical external and/or internal protective layers of subsequent multilayer reflective films.

Example 12

For example, a multilayer reflective film may be constructed with first optical layers created from polyethylene naphthalate, and second optical layers created from a copolyester having carboxylate subunits derived from 25 mol % tertiary-butyl isophthalate and 75 mol % dimethyl cyclohexane dicarboxylate, and glycol subunits derived from 99.8 mol % ethylene glycol and 0.2 mol % trimethylol propane.

The polyethylene naphthalate used to form the first optical layers is synthesized as in Example 1.

The copolyester used to form the second optical layers is synthesized in a batch reactor with the following raw material charge: 41 kg dimethyl tertiary-butyl isophthalate, 96 kg dimethyl cyclohexane dicarboxylate, 85 kg ethylene glycol, 34 g cobalt acetate, 27 g manganese acetate, 340 g trimethylol propane, and 82 g antimony triacetate. Under pressure of 2 atm, this mixture is heated to 254° C. while removing the esterification reaction by-product, methanol. Under pressure of 2 atm, this mixture is heated to 254° C. while removing the transesterification reaction by-product, methanol. After 42 kg of methanol is removed, 54 g of triethyl phosphonoacetate is charged to the reactor and then the pressure is gradually reduced to 1 torr while heating to 290° C. The condensation reaction by-product, ethylene glycol, is continuously stripped until a polymer with an intrinsic viscosity of 1.2 dL/g, as measured in 60/40 wt. % phenol/o-dichlorobenzene, is produced.

The above described coPENs may be coextruded through multilayer melt manifolds to create a multilayer film with 836 alternating first and second optical layers. This particular multilayer reflective film also contains internal protective layers and external protective layers derived from the same co(polyethylene naphthalate) as the first optical layers. These protective layers are introduced through additional melt ports. This cast film is biaxially oriented. First, the film is heated in an oven charged with hot air set at 140° C. for about one minute and then oriented at a 3.6:1 draw. Then the film is heated in an oven charged with hot air set at 150° C. for about one minute and then oriented in a transverse direction at a 4.0:1 draw. Subsequently, the biaxially oriented film is heat set at 249° C. for 5–10 seconds. The film thus produced can reflect visible light and/or infrared light dependent on the range of layer thicknesses created.

The described multilayer reflective film may then be ground into flake and extruded a second time, the co(polyethylene naphthalate) first layers and co(polyethylene naphthalate) second layers melt, mix, and transesterify to create a recycled co(polyethylene naphthalate) having carboxylate subunits derived from 70 mol % dimethyl naphthalene dicarboxylate, 22.5 mol % dimethyl cyclohexane dicarboxylate, and 7.5 mol % tertiary-butyl isophthalate, and glycol subunits derived from 99.94 mol % ethylene glycol and 0.06 mol % trimethylol propane. The new co(polyethylene naphthalate) created from recycled material may be reused as non-optical external and/or internal protective layers of subsequent multilayer reflective films.

Example 13

A multilayer reflective film may be constructed with first optical layers created from polyethylene naphthalate and second optical layers created from a co(polyethylene terephthalate) having carboxylate subunits derived from 50 mol % terephthalic acid and 50 mol % cyclohexane dicarboxylic acid, and glycol subunits derived from 99.8 mol % ethylene glycol and 0.2 mol % trimethylol propane.

The polyethylene naphthalate used to form the first optical layers is synthesized as in Example 1.

The co(polyethylene terephthalate) used to form the second optical layers is synthesized as in Example 9.

The above described coPENs may be coextruded through multilayer melt manifolds to create a multilayer film with 836 alternating first and second optical layers. This particular multilayer reflective film also contains internal protective layers and external protective layers derived from the same co(polyethylene naphthalate) as the first optical layers. These protective layers are introduced through additional melt ports. This cast film is biaxially oriented. First, the film is heated in an oven charged with hot air set at 140° C. for about one minute and then oriented at a 3.6:1 draw. Then the film is heated in an oven charged with hot air set at 150° C. for about one minute and then oriented in a transverse direction at a 4.0:1 draw. Subsequently, the biaxially oriented film is heat set at 249° C. for 5–10 seconds. The film thus produced can reflect visible light and/or infrared light dependent on the range of layer thicknesses created.

The described multilayer reflective film may be ground into flake and extruded a second time, the co(polyethylene naphthalate) first layers and co(polyethylene terephthalate) second layers melt, mix, and transesterify to create a recycled co(polyethylene naphthalate) having carboxylate subunits derived from 70 mol % dimethyl naphthalene dicarboxylate, 15 mol % dimethyl terephthalate or terephthalic acid, and 15 mol % cyclohexane dicarboxylic acid, and glycol subunits derived from 99.94 mol % ethylene glycol, and 0.06 mol % trimethylol propane. The new co(polyethylene naphthalate) created from recycled material may be reused as non-optical external and/or internal protective layers of subsequent multilayer reflective films.

Example 14

A multilayer reflective film may be constructed with first optical layers created from a co(polyethylene naphthalate) having carboxylate subunits derived from 90 mol % dimethyl naphthalene dicarboxylate and 10 mol % dimethyl cyclohexane dicarboxylate, and glycol subunits derived from 100 mol % ethylene glycol, and second optical layers created from a copolyester having carboxylate subunits derived from 20 mol % dimethyl naphthalene dicarboxylate and 80 mol % dimethyl cyclohexane dicarboxylate, and glycol subunits derived from 99.8 mol % ethylene glycol and 0.2 mol % trimethylol propane.

The co(polyethylene naphthalate) used to form the first optical layers is synthesized in a batch reactor with the following raw material charge: 126.2 kg dimethyl naphthalene dicarboxylate, 11.3 kg dimethyl cyclohexane dicarboxylate, 36.8 kg ethylene glycol, 34 g cobalt acetate, 34 g manganese acetate, and 55 g antimony triacetate. Under pressure of 2 atm, this mixture is heated to 254° C. while removing the transesterification reaction by-product, methanol. After 37 kg of methanol is removed, 61 g of triethyl phosphonoacetate is charged to the reactor and than the pressure is gradually reduced to 1 torr while heating to 290° C. The condensation reaction by-product, ethylene glycol, is continuously stripped until a polymer with an intrinsic viscosity of 0.50 dL/g, as measured in 60/40 wt. % phenol/o-dichlorobenzene, is produced.

The co(polyethylene naphthalate) used to form the second optical layers is synthesized in a batch reactor with the following raw material charge: 32.7 kg dimethyl naphthalene dicarboxylate, 105.2 kg dimethyl cyclohexane dicarboxylate, 83.2 kg ethylene glycol, 34 g cobalt acetate, 34 g manganese acetate, 340 g trimethylol propane, and 82 g antimony triacetate. Under pressure of 2 atm, this mixture is heated to 254° C. while removing the transesterification reaction by-product, methanol. After 42.7 kg of methanol is removed, 61 g of triethyl phosphonoacetate is charged to the reactor and than the pressure is gradually reduced to 1 torr while heating to 290° C. The condensation reaction by-product, ethylene glycol, is continuously stripped until a polymer with an intrinsic viscosity of 0.82 dL/g, as measured in 60/40 wt. % phenol/o-dichlorobenzene, is produced.

The above described coPENs may be coextruded through multilayer melt manifolds to create a multilayer film with 836 alternating first and second optical layers. This particular multilayer reflective film also contains internal protective layers and external protective layers derived from the same co(polyethylene naphthalate) as the first optical layers. These protective layers are introduced through additional melt ports. This cast film is biaxially oriented. First, the film is heated in an oven charged with hot air set at 135° C. for about one minute and then oriented at a 3.6:1 draw. Then the film is heated in an oven charged with hot air set at 145° C. for about one minute and then oriented in a transverse direction at a 4.0:1 draw. Subsequently, the biaxially oriented film is heat set at 249° C. for 5–10 seconds. The film thus produced can reflect visible light and/or infrared light dependent on the range of layer thicknesses created.

The described multilayer reflective film may be ground into flake and extruded a second time (recycled), the co(polyethylene naphthalate) first layers and co(polyethylene naphthalate second layers melt, mix, and transesterify to create a recycled co(polyethylene naphthalate) having carboxylate subunits derived from 69 mol % dimethyl naphthalene dicarboxylate and 31 mol % dimethyl cyclohexane dicarboxylate, and glycol subunits derived from 99.94 mol % ethylene glycol and 0.06 mol % trimethylol propane. The new co(polyethylene naphthalate) created from recycled material may be reused as non-optical external and/or internal protective layers of subsequent multilayer reflective films.

Example 15

A multilayer reflective polarizer film was constructed with first optical layers created from polyethylene naphthalate (PEN) and second optical layers created from polyethylene terephthalate (PET).

The PEN used to form the first optical layers was synthesized in a batch reactor with the following raw material charge: 136 kg dimethyl naphthalene dicarboxylate, 73 kg ethylene glycol, 27 g manganese acetate, 27 g cobalt acetate, and 48 g antimony triacetate. Under pressure of 2 atm, this mixture was heated to 254° C. while removing the transesterification reaction by-product, methanol. After 35 kg of methanol was removed, 49 g of triethyl phosphonoacetate was charged to the reactor and then the pressure was gradually reduced to 1 torr while heating to 290° C. The condensation reaction by-product, ethylene glycol, was continuously removed until a polymer with an intrinsic viscosity of 0.48 dL/g, as measured in 60/40 wt. % phenol/o-dichlorobenzene, was produced.

PET having an intrinsic viscosity of 0.77 dL/g is available from Dupont (Fayetteville, N.C.), luminar grade 5122C.

The above described PEN and PET were coextruded into a 224 multilayer feedblock and provided with a thick non-optical surface layers. The multilayer stack was split with an asymmetric multiplier to form two streams having a width ratio of 1.55:1. The two streams were spread to equivalent widths and then stacked to form a two packet multilayer stack of 448 layers separated by an internal non-optical layer and having non-optical surface layers. The internal non-optical layer and the non-optical surface layers were made using PET (intrinsic viscosity=0.77 dL/g). A PEN (intrinsic viscosity=0.48 dL/g) non-optical skin layer was added over the non-optical surface layers. The total stream was then cast from a die onto a quench wheel set at 60° C. The non-optical skin layers were about 35% of the construction, the non-optical surface layers and internal layer were about 15%, and the optical layers were about 50%. The cast thickness was about 0.1 cm.

The film was first drawn using a long orienter. The film was preheated with hot rollers set at 120° C. and fed into a draw gap having a slow roll and a fast roll, as well as an infrared heater. Residence time on the rolls was about 4 seconds. The fast roll was set to accomplish a 5:1 draw and then the drawn film was quenched. The drawn width diminished to about 85% of the original width.

The film was next drawn approximately 3.3:1 in a transverse direction using a tenter. The tenter was set at 145° C. in a preheat zone, 138° C. in a draw zone, 227° C. in a heat set zone, and 49° C. in a quench zone. Preheating, drawing, and heat setting were accomplished in 25, 5, and 40 seconds, respectively. This multilayer reflective polarizer film had a thickness of approximately 60 Tm.

The described multilayer reflective polarizer film may be ground into flake and extruded a second time (recycled) with twin screw extruder, the PEN and PET layers melt, mix, and transesterify to create a new recycled co(polyethylene naphthalate) having carboxylate subunits derived from 50 mol % dimethyl naphthalene dicarboxylate and 50 mol % dimethyl terephthalate, and glycol subunits derived from 100 mol % ethylene glycol. The new co(polyethylene naphthalate) created from the recycled material may be reused for the non-optical external and internal protective layers of subsequent multilayer reflective films which differ from the present film only in the formulation of the material for the internal and external protective layers.

If desired, virgin PEN may be added to the recycled material to form, for example a co(polyethylene naphthalate) having carboxylate subunits derived from 70 mol % dimethyl naphthalene dicarboxylate and 30 mol % dimethyl terephthalate, and glycol subunits derived from 100 mol % ethylene glycol. This may also be used within subsequent multilayer reflective films, which differ from the two previously described films in this Example in the formulation of the material for the internal and external protective layers.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A multilayered optical film, comprising:
   a stack of layers comprising
      one or more first optical layers comprising a birefringent first polymer;
      one or more second optical layers comprising a second polymer; and
      one or more non-optical layers comprising polymer material;
      wherein the first polymer comprises first monomer subunits and the second polymer comprises second monomer subunits different from the first monomer subunits, and the polymer material of the one or more non-optical layers comprises the first and second monomer subunits, based on total monomer subunits, in the same relative molar proportions as the molar proportions of the first and second monomer subunits in a combination of all the first and second optical layers of the multilayered polymer film.

2. The multilayered optical film of claim 1, wherein the polymer material of the one or more non-optical films is recycled from one or more prior-manufactured multilayered polymer films.

3. The multilayered optical film of claim 1, wherein at least one of the one or more non-optical layers is disposed over the stack.

4. The multilayered optical film of claim 1, wherein at least one of the one or more non-optical layers is disposed within the stack.

5. The multilayered optical film of claim 1, wherein the first polymer is a polyester, a polycarbonate, a polyacrylate, polystyrene, polyphenylene oxide, or a combination thereof.

6. The multilayered optical film of claim 1, wherein the first polymer is a first polyester and the second polymer is a second polyester.

7. The multilayered optical film of claim 6, wherein the first monomer subunits are first glycol subunits and the second monomer subunits are second glycol subunits.

8. The multilayered optical film of claim 6, wherein the first monomer subunits are first carboxylate subunits and the second monomer subunits are second carboxylate subunits.

9. The multilayered optical film of claim 8, wherein the first polymer further comprises first glycol subunits and the second polymer further comprises second glycol subunits different from the first glycol subunits and wherein the polymer material of the one or more non-optical layers comprises the first and second glycol subunits in the same relative molar proportions as the molar proportions of the first and second glycol subunits in a combination of all the first and second optical layers of the multilayered polymer film.

10. The multilayered optical film of claim 8, wherein the first carboxylate subunits are naphthalate or terephthalate subunits.

11. The multilayered optical film of claim 10, wherein the second carboxylate subunits are derived from 2,6-naphthalene dicarboxylic acid or isomers thereof; terephthalic acid; isophthalic acid; phthalic acid; azelaic acid; adipic acid; sebacic acid; norbomene dicarboxylic acid; bi-cyclooctane dicarboxylic acid; 1,4-dicyclohexane dicarboxylic acid or isomers thereof; t-butyl isophthalic acid; tri-mellitic acid; sodium sulfonated isophthalic acid; 2,2'-biphenyl dicarboxylic acid or isomers thereof; or C1-C10 alkyl esters of these acids.

12. The multilayered optical film of claim 8, wherein the second polyester further comprises third carboxylate subunits.

13. The multilayered optical film of claim 12, wherein the first and third carboxylate subunits are the same.

14. The multilayered optical film of claim 12, wherein the first polyester further comprises fourth carboxylate subunits.

15. A multilayered polymer film comprising:
a stack of layers using one or more first optical layers, one or more second optical layers, and one or more non-optical layers, the one or more first optical layers comprising a first polymer, the one or more second optical layers comprising a second polymer, and the one or more non-optical layers comprising a third polymer, wherein the third polymer consists essentially of monomer subunits, based on total monomer subunits, in the same relative molar proportions as the molar proportions of all of the monomer subunits in a combination of all the first and second optical layers of the multilayered polymer film.

16. The multilayered optical film of claim 15, wherein the first optical layers are birefringent.

17. The multilayered optical film of claim 15, wherein the first polymer is a polyester.

18. The multilayered optical film of claim 17, wherein the second polymer is a polyester.

19. A multilayered polymer film comprising:
a stack of layers comprising
one or more first optical layers comprising a first polyester, wherein the first polyester comprises first carboxylate subunits;
one or more second optical layers comprising a second polyester, wherein the second polyester comprises second carboxylate subunits, the first and second carboxylate subunits being different; and
one or more non-optical layers comprising a third polyester, wherein the third polyester comprises the first and second carboxylate subunits in the same relative molar proportions, based on total carboxylate subunits, as the molar proportions of the first and second carboxylate subunits in a combination of all the first and second optical layers of the multilayered polymer film.

20. The multilayered polymer film of claim 19, wherein the one or more first optical layers are birefringent.

21. The multilayered polymer film of claim 19, wherein the one or more first carboxylate subunits are naphthalate or terephthalate subunits.

22. The multilayered polymer film of claim 19, wherein the second carboxylate subunits are derived from 2,6-naphthalene dicarboxylic acid or isomers thereof; terephthalic acid; isophthalic acid; phthalic acid; azelaic acid; adipic acid; sebacic acid; norbornene dicarboxylic acid; bi-cyclooctane dicarboxylic acid; 1,4-dicyclohexane dicarboxylic acid or isomers thereof, t-butyl isophthalic acid; tri-mellitic acid; sodium sulfonated isophthalic acid; 2,2'-biphenyl dicarboxylic acid or isomers thereof, or C1–C10 alkyl esters of these acids.

23. The multilayered polymer film of claim 19, wherein the non-optical layers further comprise a process aid material compatible with the first and second polyesters.

24. The multilayered polymer film of claim 19, wherein the first polyester further comprises first glycol subunits, the second polyester further comprises second glycol subunits, the first and second glycol subunits being different, and the third polyester comprises the first and second glycol subunits in the same relative molar proportions as the molar proportions of the first and second glycol subunits in a combination of all the first and second layers of the multilayered polymer film.

25. The multilayered polymer film of claim 19, wherein at least one of the one or more non-optical layers forms a skin layer on at least one surface of the stack of layers.

26. The multilayered polymer film of claim 19, wherein the first polyester is polyethylene naphthalate.

27. The multilayered polymer film of claim 19, wherein the first polyester is polyethylene terephthalate.

28. The multilayered polymer film of claim 19, wherein the first and second optical layers are formed in alternating pairs of layers.

29. The multilayered polymer film of claim 28, wherein at least one of the one or more non-optical layers is disposed between two of the alternating pairs of first and second optical layers.

30. A multilayered polymer film comprising:
a stack of layers comprising
one or more first optical layers comprising a first polyester, wherein the first polyester comprises first glycol subunits;
one or more second optical layers comprising a second polyester, wherein the second polyester comprises second glycol subunits, the first and second glycol subunits being different; and
one or more non-optical layers comprising a third polyester, wherein the third polyester comprises the first and second glycol subunits in the same relative molar proportions, based on total glycol subunits, as the molar proportions of the first and second glycol subunits in a combination of all the first and second optical layers of the multilayered polymer film.

31. The multilayered polymer film of claim 30, wherein the first glycol subunits are ethylene or butylene.

32. A multilayered optical film, comprising:
a stack of layers comprising
one or more first optical layers comprising a birefringent first polyester;
one or more second optical layers comprising a second polyester, and
one or more non-optical layers comprising polyester material that is recycled from one or more prior-manufactured multilayered polymer films,
wherein the first polyester comprises first carboxylate subunits and the second polyester comprises second carboxylate subunits, and the polyester material of the one or more non-optical layers comprises the first and second carboxylate subunits in the same relative molar proportions, based on total carboxylate subunits, as the molar proportions of the first and second carboxylate subunits in a combination of all the first and second optical layers of the multilayered optical film.

33. The multilayered optical film of claim 32, wherein the one or more non-optical layers further comprises non-recycled polyester material.

* * * * *

UNITED STATES PATENT AND TRADEMARK OFFICE
CERTIFICATE OF CORRECTION

PATENT NO. : 6,569,515 B2  
DATED : May 27, 2003  
INVENTOR(S) : Timothy J. Hebrink et al.

It is certified that error appears in the above-identified patent and that said Letters Patent is hereby corrected as shown below:

Column 3,  
Line 42, after the phrase "No. 08/402,041", insert -- , now Pat. No. 5,882,744, --.  
Line 43, delete "U.S. patent application" and insert in place thereof -- U.S. Patent Application 09/006601 --.  
Line 45, delete "filed on on even date by applicants under Attorney Docket No. 53550USA6A" and insert in place thereof -- now abandoned --.  
Line 46, delete "U.S. patent application" and insert in place thereof -- U.S. Patent Application 09/006288 --.  
Line 47, delete "filed on even date by applicants under Attorney Docket No. 51932USA8A" and insert in place thereof -- , now abandoned --.  
Line 56, delete "filed on even date by applicants under Attorney Docket No. 53546USA5A" and insert in place thereof -- , now Pat. No. 6,179,948 --.

Column 4,  
Line 60, delete "bi-cyclohexane cyclooctane" and insert in place thereof  
-- bi-cyclooctane --.

Column 9,  
Line 14, after the phrase "Ser. No. 08/612,710" insert -- , now US 5,759,467 --.

Column 13,  
Line 46, delete "U.S. patent application" and insert in place thereof -- U.S. Patent Application 09/006601 --.  
Line 48, delete "filed on even date by applicants under Attorney Docket No. 53550USA6A" and insert in place thereof -- now abandoned --.

Column 14,  
Line 9, delete "U.S. patent application" and insert in place thereof -- U.S. Patent Application 09/006288 --.  
Line 11, delete "filed on even date by applicants under Attorney Docket No. 51932USA8A" and insert in place thereof -- , now abandoned --.

Column 33,  
Line 56, delete "one or more first carboxylate subunits are" and insert in place thereof -- said first carboxylate subunit is --.

UNITED STATES PATENT AND TRADEMARK OFFICE
CERTIFICATE OF CORRECTION

PATENT NO. : 6,569,515 B2
DATED : May 27, 2003
INVENTOR(S) : Hebrink, Timothy J.

It is certified that error appears in the above-identified patent and that said Letters Patent is hereby corrected as shown below:

<u>Column 34,</u>
Line 44, delete "ethylene or butylenes" and insert in place thereof -- ethylene glycol or butylenes glycol --.

Signed and Sealed this

Sixth Day of January, 2004

JAMES E. ROGAN
*Director of the United States Patent and Trademark Office*